(12) United States Patent
Zuffa et al.

(10) Patent No.: US 8,038,434 B2
(45) Date of Patent: Oct. 18, 2011

(54) MOULDS FOR MOULDING OBJECTS MADE OF PLASTICS AND A METHOD FOR PRODUCING A MOULD ELEMENT

(75) Inventors: Zeno Zuffa, Borgo Tossignano (IT); Florenzo Parrinello, Medicina (IT)

(73) Assignee: Sacmi Cooperativa Meccanici Imola Societa' Cooperativa, Imola (IT)

( * ) Notice: Subject to any disclaimer, the term of this patent is extended or adjusted under 35 U.S.C. 154(b) by 543 days.

(21) Appl. No.: 11/991,469

(22) PCT Filed: Aug. 21, 2006

(86) PCT No.: PCT/EP2006/065500
§ 371 (c)(1),
(2), (4) Date: Jun. 11, 2008

(87) PCT Pub. No.: WO2007/028702
PCT Pub. Date: Mar. 15, 2007

(65) Prior Publication Data
US 2008/0277820 A1    Nov. 13, 2008

(30) Foreign Application Priority Data

Sep. 7, 2005   (IT) .............................. MO2005A0224

(51) Int. Cl.
*B29C 49/64*   (2006.01)
*B29C 49/76*   (2006.01)
(52) U.S. Cl. ........ 425/526; 425/525; 425/533; 425/407; 249/79
(58) Field of Classification Search .................. 425/526, 425/533, 547, 548, 552, 407, 525; 249/79–81
See application file for complete search history.

(56) References Cited

U.S. PATENT DOCUMENTS

| | | | | |
|---|---|---|---|---|
| 5,599,567 A | * | 2/1997 | Gellert | 425/526 |
| 5,930,882 A | * | 8/1999 | Gellert | 29/411 |
| 6,017,209 A | * | 1/2000 | Gellert et al. | 425/549 |
| 6,079,972 A | * | 6/2000 | Gellert | 425/552 |
| 6,322,350 B1 | * | 11/2001 | Voets et al. | 425/548 |
| 6,444,159 B2 | * | 9/2002 | Petre | 264/520 |
| 6,632,081 B2 | * | 10/2003 | Cromwijk | 425/547 |

(Continued)

FOREIGN PATENT DOCUMENTS

DE        100 22 289        11/2001
(Continued)

OTHER PUBLICATIONS

Translation of DE 102 36 523.*

(Continued)

*Primary Examiner* — Joseph Del Sole
*Assistant Examiner* — Dimple Bodawala
(74) *Attorney, Agent, or Firm* — Nixon & Vanderhye P.C.

(57) ABSTRACT

A mould comprises at least two die parts, each die part comprising a recess for forming a portion of an object and a conduit arrangement through which a cooling fluid can flow, the conduit arrangement comprising a curved conduit which surrounds the recess, an inlet conduit having a supply portion which leads into the curved conduit and an outlet conduit having a discharge portion which leaves the curved conduit so as to define a path for the cooling fluid, the curved conduit, the supply portion and the discharge portion being arranged so as to be interceptable by a common plane that contains the path.

25 Claims, 18 Drawing Sheets

U.S. PATENT DOCUMENTS

| | | | |
|---|---|---|---|
| 2003/0064128 A1* | 4/2003 | Byrnes | 425/552 |
| 2005/0276879 A1* | 12/2005 | Niewels et al. | 425/547 |
| 2007/0264383 A1* | 11/2007 | Niewels et al. | 425/526 |
| 2007/0267783 A1* | 11/2007 | Niewels et al. | 264/327 |
| 2009/0162473 A1* | 6/2009 | Neter et al. | 425/547 |

FOREIGN PATENT DOCUMENTS

| | | |
|---|---|---|
| DE | 102 36 523 | 2/2004 |
| DE | 10236523 | 2/2004 |
| EP | 0 768 164 | 4/1997 |
| EP | 1 270 164 | 1/2003 |
| JP | 06008297 A * | 1/1994 |
| JP | 9-234770 | 9/1997 |
| JP | 2003-103324 | 4/2003 |
| WO | WO/00/38901 | 7/2000 |
| WO | 01/85419 | 11/2001 |
| WO | 2005/108044 | 11/2005 |
| WO | 2005/120802 | 12/2005 |

OTHER PUBLICATIONS

International Search Report for PCT/EP2006/065500 mailed Jan. 18, 2007.

International Preliminary Report on Patentability for PCT/EP2006/065500.

* cited by examiner

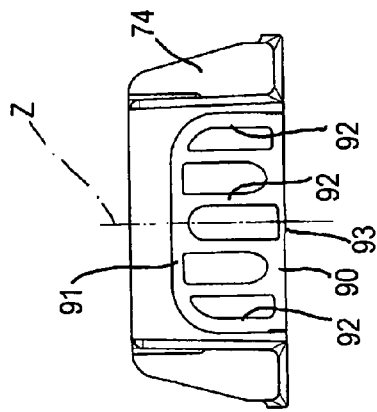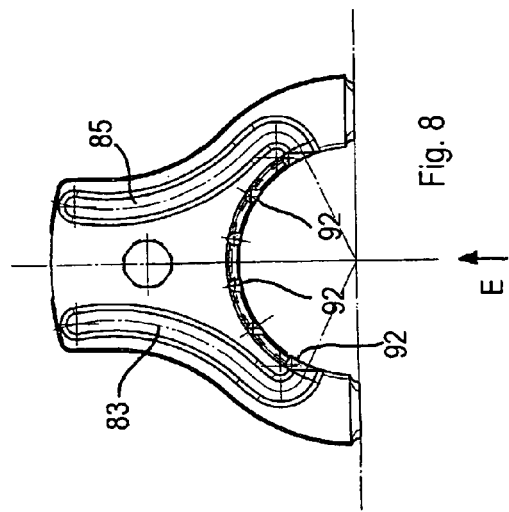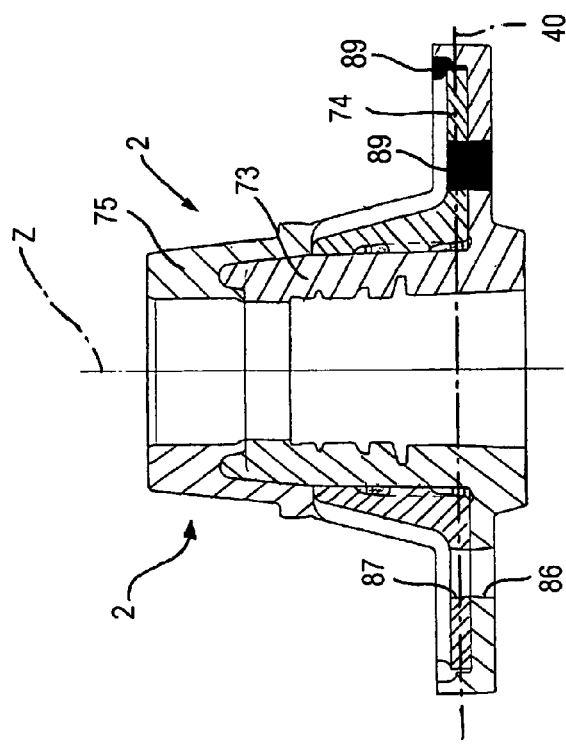

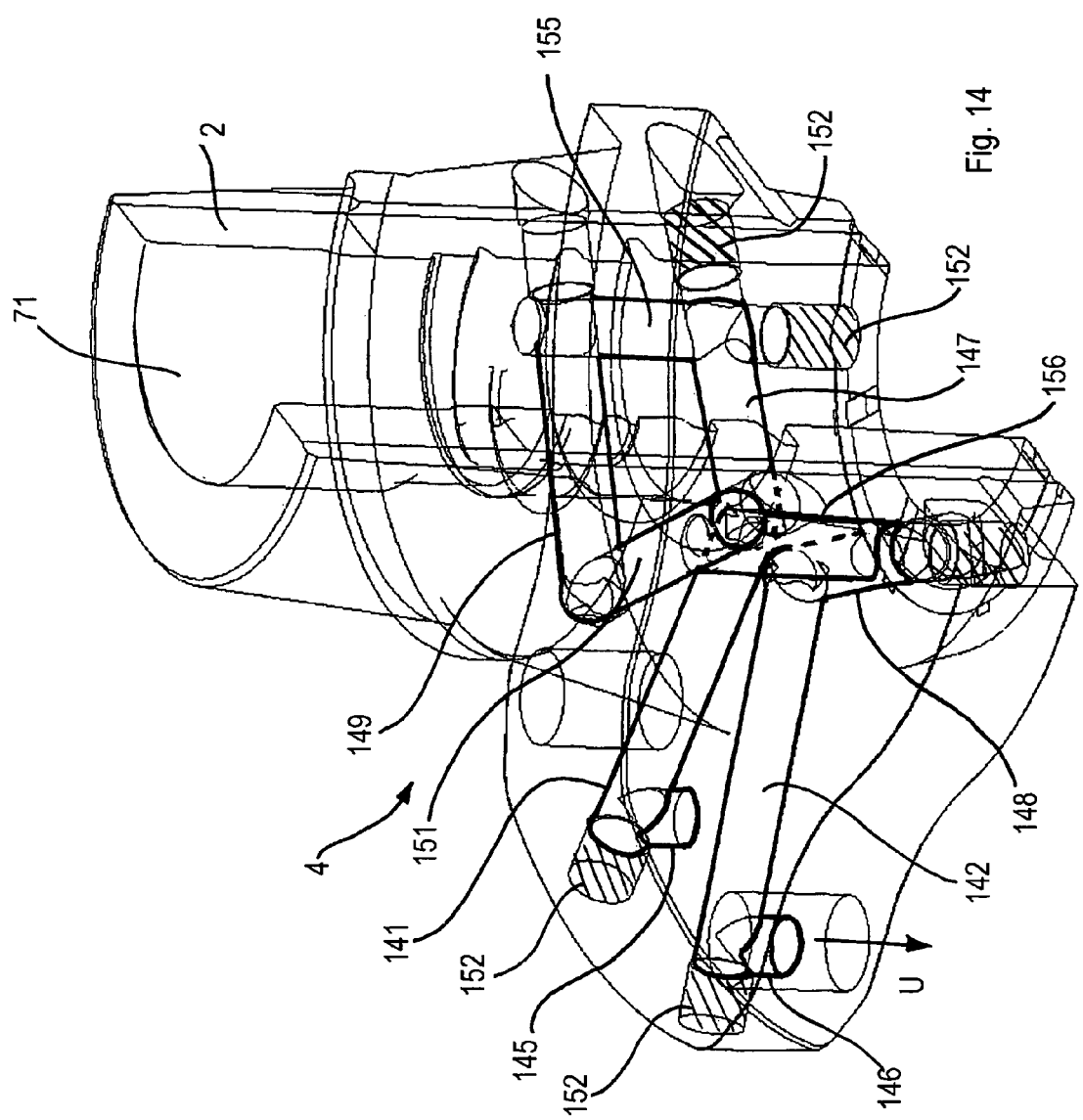

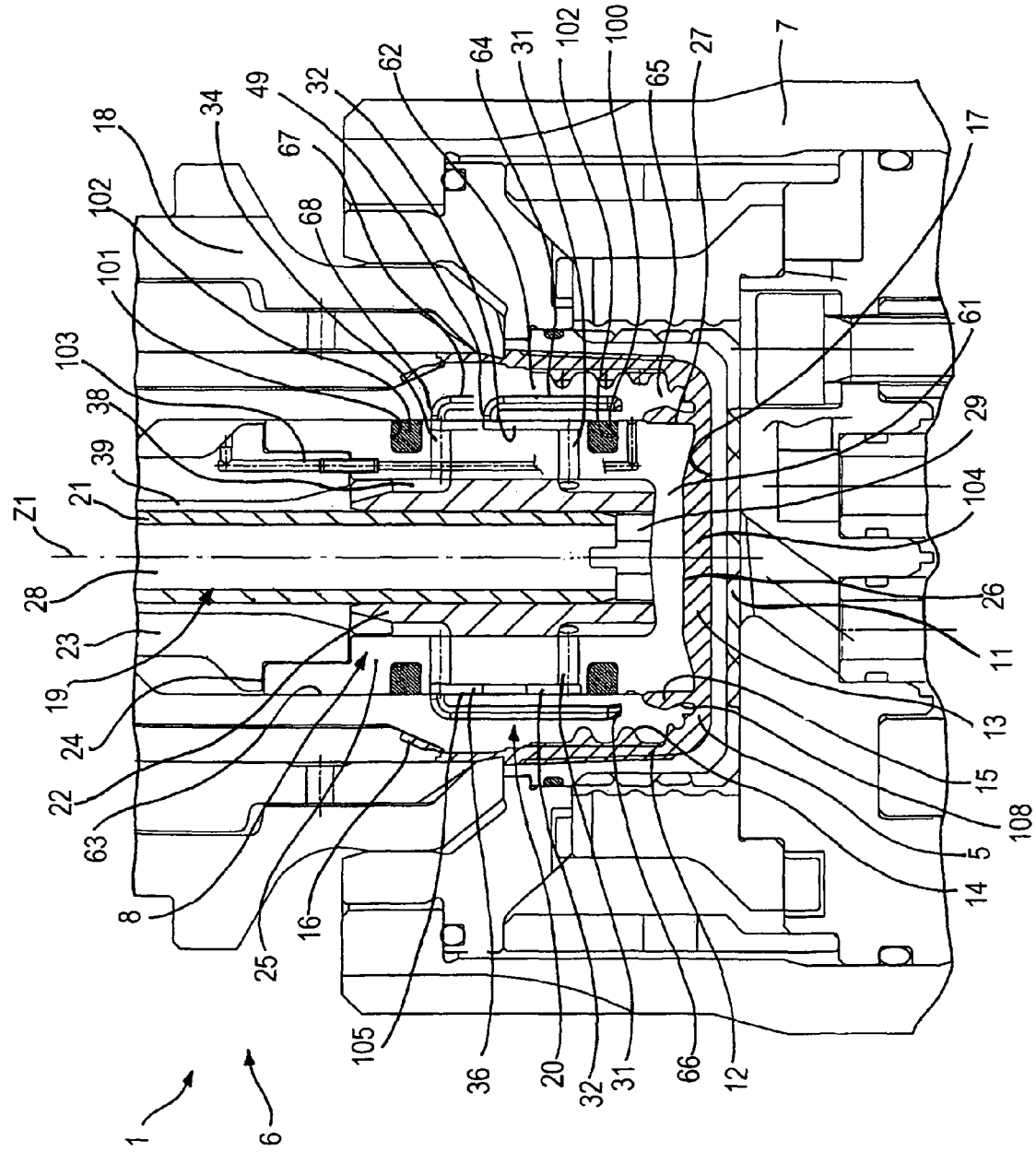

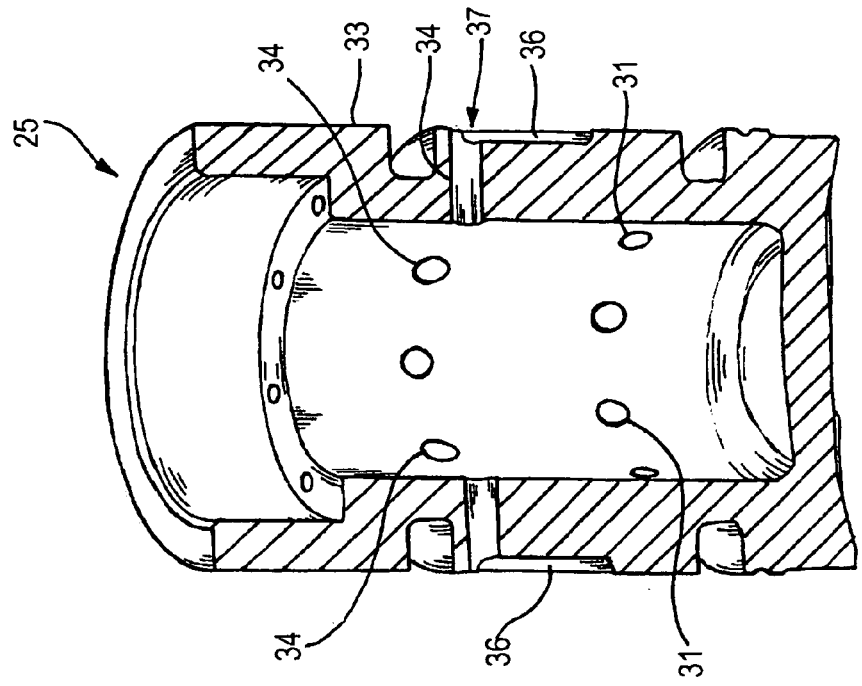
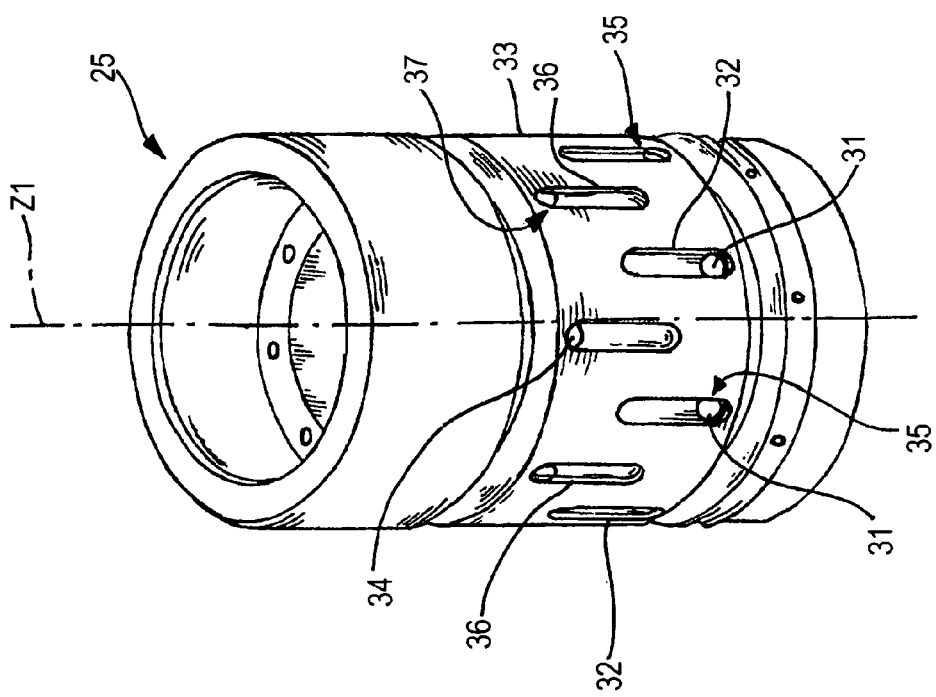

MOULDS FOR MOULDING OBJECTS MADE OF PLASTICS AND A METHOD FOR PRODUCING A MOULD ELEMENT

CROSS-REFERENCE TO RELATED APPLICATIONS

This application is the U.S. national phase of International Application No. PCT/EP2006/065500, filed 21 Aug. 2006, which designated the U.S. and claims priority to Italy Patent Application No. MO2005A000224, filed 7 Sep. 2005, the entire contents of each of which are hereby incorporated by reference.

DESCRIPTION

The invention relates to moulds for moulding objects made of plastics, and in particular moulds provided with cooling conduits, suitable for injection or compression moulding of objects, such as preforms for bottles or closing caps.

The objects to be moulded can be made of plastics, for example polyethyleneterephthalate (PET), polypropylene (PP), polyvinyl chloride (PVC), polyethylene naphthalate (PEN), high-density polyethylene (HDPE).

The invention furthermore relates to a method for forming mould elements provided with a conduit arrangement through which a cooling fluid can flow.

EP0768164 discloses a pair of thread split inserts used for injection moulding a bottle preform neck portion, each having a rear end, a pair of flat aligned faces and a curved inner surface. The curved inner surface is generally semi-circular, and incorporates a semi-circular groove and a thread portion, and each insert is provided with upper and a lower tapered flange portions. Each thread split insert is further provided with a cooling fluid conduit.

EP1270164 discloses a method of making pairs of splits inserts used to injection mold bottle preforms. The method comprises machining a hollow outer part of each split insert so as to obtain an opening therethrough and outer portions of two cooling conduits, the two cooling conduits extending from the opening therethrough to respective inlets and outlets. The method further comprises making an inner part of the split inserts by injection molding a ceramic core and by investment casting the inner part around the ceramic core. On the outer surfaces of the inner part, inner portions of the cooling fluid conduits are obtained.

The outer part is then mounted around the inner part so as to align the inner and outer portions of the two cooling fluid conduits.

The inner and outer part are then integrally brazed together. Finally, there is provided cutting the integral inner and outer parts in half to form the pair of split inserts with each of the split inserts having one of the cooling fluid conduits therein.

DE10022289 discloses an apparatus for forming a workpiece from plastics, comprising a core element provided with an internal case part and an external case part. The internal case part and the external case part are connected to one another by braze welding and together define a duct system. The duct system acts for keeping the temperature at a moderate value during process.

Moulds are known comprising a pair of dies or inserts of half moulds, suitable for forming by moulding elements such as, for example, preforms or parts of preforms, generally provided with projecting portions or undercuts, which constitute portions of bottle necks or other containers. The portions of bottle necks made of plastics in fact have projections comprising a fitting thread for a corresponding cap and an annular collar.

At the end of moulding, the preform remains in the mould for a certain period of time so as to cool and consolidate the shape thereof. Subsequently, the preform is extracted from the mould, by removing the two dies from one another so as to free the undercuts.

The preform has to be cooled in a sufficiently rapid manner to reduce moulding time and ensure high production speed.

To cool the preforms, the dies are provided with a circuit through which a cooling fluid flows. The circuit generally comprises a plurality of rectilinear conduits, made by mechanical drilling operations with machine tools. The conduits are generally arranged on a single level and are intersected amongst themselves to form the circuit through which the cooling fluid flows.

In the case of dies that, in a closed configuration, define a cavity delimited by a substantially cylindrical forming surface, the rectilinear conduits are arranged tangentially to this cavity. Thus, adjacent zones of the forming surface are at distances that are different from one another from the rectilinear conduits and are not uniformly cooled by the cooling fluid.

Caps for bottles or containers are known comprising a cup body delimited by a cylindrical side wall, provided with an inner threaded surface closed at an end thereof by a bottom wall. A sealing lip is projected from the bottom wall to the inside of the cup body. During use, the sealing lip engages with an edge of the container so that the container is closed in a substantially hermetic manner.

The caps of the disclosed type are obtained inside moulds comprising a die provided with a forming cavity and a punch interacting with the die to form plastics in fluid or semifluid state so as to form the cap. The sealing lip is formed together with the cup body and the whole of the cup body and the sealing lip constitutes a single piece. If the sealing lip has undercut zones, in order for detaching the cap from the punch, the latter is made of two parts and comprises a central element and an outer element that can move with respect to the central element so as to remove the cap that has already been formed from the central element.

The moulds for closing caps of the type disclosed above are provided with circuits through which a cooling fluid can flow, that enables the cap to be cooled before the cap is extracted from the mould. This circuits are realized both in the die and in the central element of the punch.

A drawback of known moulds arranged for making caps is that they do not enable efficient and rapid cooling from the inside of the cap, in particular at the threaded surface of the cap and at the sealing lip. This drawback enables the cooling time to be increased and therefore the duration of the moulding cycle to be increased, with a reduction in production speed.

An object of the invention is to improve known moulds for moulding objects made of plastics.

Another object is to provide moulds for forming objects made of plastics that have great cooling efficiency.

Still another object is to obtain a mould that enables all the zones of the forming cavity to be cooled in an almost uniform manner, with good heat exchange and high cooling speed.

A further object is to obtain a mould that has a cooling circuit that is efficient and at the same relatively simple and rapid to make.

Another object is to provide a method for producing mould elements provided with a conduit arrangement through which a cooling fluid can flow that is easily actuatable.

Still another object is to provide a method for producing mould elements that enables even conduit arrangement having a complicated geometry to be obtained in the mould elements.

In a first aspect of the invention, a mould is provided comprising at least two die parts, each die part comprising a recess for forming a portion of an object and a conduit arrangement through which a cooling fluid can flow, said conduit arrangement comprising a curved conduit which surrounds said recess, an inlet conduit having a supply portion which leads into said curved conduit and an outlet conduit having a discharge portion which leaves said curved conduit so as to define a path for said cooling fluid, wherein said curved conduit, said supply portion and said discharge portion are so arranged as to be interceptable by a common plane that contains said path.

In a second aspect of the invention, a mould is provided comprising at least two die parts, each die part comprising a recess for forming a portion of an object and a conduit arrangement through which a cooling fluid can flow, said conduit arrangement comprising a cooling conduit which surrounds said recess, an inlet conduit which leads into said cooling conduit and an outlet conduit which leaves said cooling conduit, wherein said cooling conduit extends wavily around said recess.

Owing to these aspects of the invention, it is possible to obtain a modular mould of the type used for example in moulding preforms made of plastics, in which it is possible to cool in an efficient and uniform manner the die parts. The shape of the conduit arrangement enables the heat exchange between the cooling fluid and the object to be formed to be increased substantially in all the points of the object. This causes an increase in the cooling speed and consequently enables the cooling time and the duration of the moulding cycle to be decreased, thus increasing production speed.

In a third aspect of the invention, a mould is provided comprising at least two die parts, each die part comprising a recess for forming a portion of an object and a cooling conduit arrangement through which a cooling fluid can flow, said cooling conduit arrangement extending around said recess at least on two distinct levels, wherein said cooling conduit arrangement comprises a sequence of rectilinear conduits.

The cooling conduit arrangement extends on two levels or planes and enables efficient and uniform cooling of the recess of the die arrangement.

If mould according to the third aspect of the invention is shaped so as to form container preforms, the cooling conduit arrangement extending on two distinct levels enables the preform to be cooled effectively also if the portion of preform formed by said at least two parts of die is relatively extensive, as occurs in preforms from which containers are obtained having great capacity.

The cooling conduit arrangement which comprises a succession of rectilinear conduits is furthermore relatively simple and rapid to realize, for example by mechanical machining with machine tools.

In a fourth aspect of the invention, a mould is provided comprising a punch device provided with an inner forming arrangement and with an outer forming arrangement that are movable with respect to one another, said punch device comprising a passage arrangement through which a cooling fluid can flow, wherein said passage arrangement comprises a first conduit arrangement made in said inner forming arrangement and a second conduit arrangement made in said outer forming arrangement.

Owing to this aspect of the invention it is possible to obtain a mould, suitable for moulding objects made of plastics such as caps for closing containers, in which the formed object is cooled in an efficient and uniform manner. In particular, the mould according to the fourth aspect of the invention enables the zones of the formed object, that contact the inner forming arrangement and above all the outer forming arrangement, to be cooled in an optimal manner.

If the mould according to the fourth aspect of the invention is used to form caps provided with a sealing lip, the second conduit arrangement enables the lip to be cooled effectively, so that the cap can be extracted from the mould almost immediately after being formed. If the cap is furthermore provided with an inner thread, also the latter can be cooled effectively by the second conduit arrangement. In particular, the second conduit arrangement can be designed in such a way as to cool different zones of the cap in a differentiated manner.

For example, the portions of the cap that are most difficult to remove from the punch are notoriously those provided with thread parts nearer the bottom wall inasmuch as the thread parts nearer the bottom wall are not easily deformable. By shaping the second conduit arrangement appropriately, it is possible to cool the thread parts nearer the bottom wall more intensely than the further thread parts further from the bottom wall. When the thread parts nearer the bottom wall have been well cooled, it is possible to exert on the thread parts, without damaging them, relatively great force so as to deform these thread parts by a sufficient quantity to remove the cap from the punch.

In general, the second conduit arrangement can be designed in such a way as to customize the cooling of the formed object, so as to improve cooling in the more critical zones.

In a fifth aspect of the invention, a method is provided for producing a mould element provided with a conduit arrangement through which a cooling fluid can flow, said method comprising the following steps:

providing a first component and a second component of said mould element, said first component being provided with a precursor arrangement of said conduit arrangement comprising an open channel arrangement;

joining said first component and said second component, so that a surface of said second component faces said open channel arrangement to define therewith said conduit arrangement.

Owing to this aspect of the invention, it is possible to produce with relative facility a mould element provided with a conduit arrangement having even a very complicated geometry. The open channel arrangement obtained on the first component can in fact extend substantially along any desired path. It is thus possible to avoid complex drilling or mechanical processing operations designed to obtain the conduit arrangement inside a single component. In particular, owing to the fifth aspect of the invention, it is possible to produce mould elements provided with a conduit arrangement having curved portions that it would not be possible to obtain by drilling.

The invention can be better understood and implemented with reference to the enclosed drawings that show some exemplifying and non-limitative example thereof, in which:

FIG. 7 is a section view like the one in FIG. 2, showing another alternative embodiment of the conduit arrangement;

FIG. 8 is a view like the one in FIG. 3, showing a component of a movable part of the mould in FIG. 7;

FIG. 9 is a view taken from the direction E of FIG. 8;

FIG. 14 is a view taken like the one in FIG. 13, according to a different angle;

FIG. 15 is a partially sectioned view showing a mould for producing caps in a closed position;

FIG. 16 is a schematic perspective view showing an inner forming element of a punch device of the mould in FIG. 15;

FIG. 17 is a section of the element of FIG. 16, taken along a plane containing the axis Z1;

Figure 1:
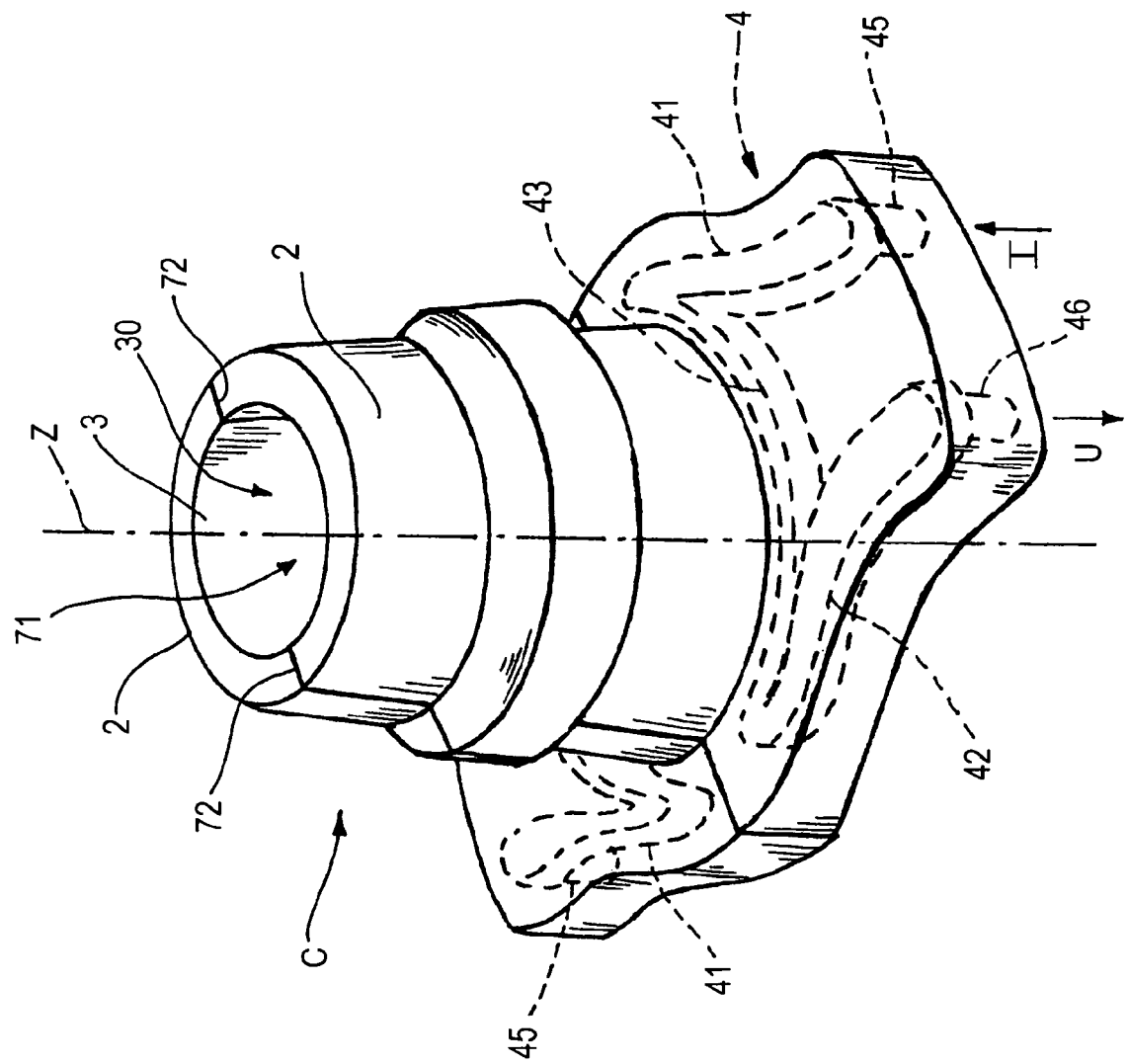
FIG. 1 is a perspective view that shows two movable parts of a mould for forming containers preforms.

With reference to FIG. 1, a portion of a mould is shown that is included in an apparatus for forming preforms by compression or injection moulding of plastics, for example polyethyleneterephthalate (PET), polypropylene (PP), polyvinyl chloride (PVC), polyethylene naphthalate (PEN) or high-density polyethylene (HDPE).

The preforms thus obtained can be used subsequently to obtain containers, for example bottles, by stretch-blowing.

The preforms for obtaining bottles usually comprise a substantially cylindrical internally hollow body having an end closed by means of a curved wall. An open end of the preform, opposite the aforementioned closed end, is provided with a neck that may have an external thread that is suitable for engaging in a shapingly coupled manner an inner thread obtained on a cap. The neck furthermore comprises an annular projection arranged below the inner thread and a collar arranged in turn below the annular projection.

The mould in FIG. 1 comprises a punch that is not shown that reproduces the inner shape of the preform and a die arrangement that is decomposable into two movable parts 2 and into a lower die that is not shown. In the lower die that is not shown the substantially cylindrical body of the preform is shaped externally, which body is intended to form a containing body of the finished container, whilst the movable parts 2 form at least the neck of the preform. In particular, if the container that it is desired to obtain from the preform is a bottle of limited capacity, the movable parts 2 shape only the neck comprising the outer threads, the annular projection and the neck, which do not undergo substantial shape variations during the subsequent process of stretch-blowing suffered by the preform. If, on the other hand, it is desired to obtain a bottle of great capacity, for example 1.5 liters, the movable parts 2 shape not only the neck, but also an intermediate portion of the preform intended to form a part of the containing body of the bottle. This intermediate portion can be externally delimited by a cylindrical surface, or by a frustum-conical surface that makes it possible to go from a smaller outer diameter near the neck to a greater outer diameter further away from the neck.

Figure 2:
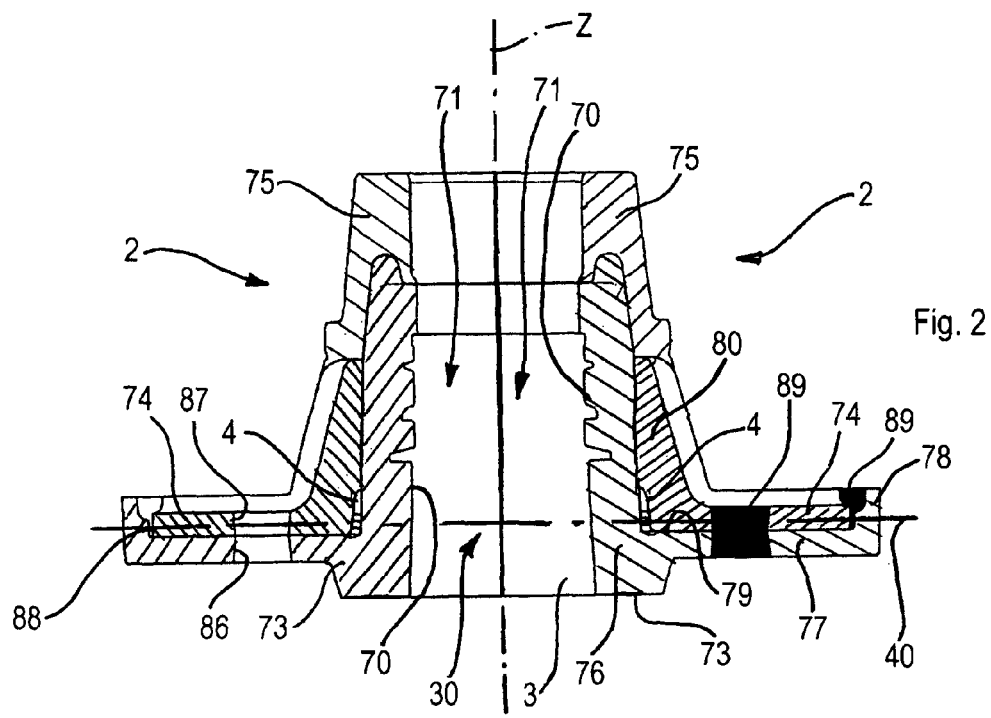
FIG. 2 is a section view of the moving parts of FIG. 1, taken along a longitudinal axis of the mould.

The movable parts 2 are substantially the same as one another and each comprises a concave region 3 on which a forming surface 70 is obtained, shown in FIG. 2, that delimits a recess 71. Each forming surfaces 70 reproduces the shape of a portion and more precisely of half of the neck of the preform.

Each movable part 2 further comprises two contact surfaces 72, that may be flat, arranged on the sides of the corresponding recess 71.

The movable parts 2 are movable between a closing configuration C, shown in FIG. 1, and an opening configuration that is not shown. In the closing configuration C, the contact surfaces 72 of each movable part 2 abut on the corresponding contact surfaces 72 of the other movable part 2. Between the two concave regions 3 a forming cavity 30 is defined that enables at least the neck of the preform to be formed externally.

In the opening configuration, the movable parts 2 are spaced from one another so as to enable the preform to be extracted from the mould.

In each movable part 2 a conduit arrangement 4 is obtained through which a cooling fluid can flow, for example water, that enables the preform to be cooled both during a respective forming step and at the end of this step. The cooling fluid moves inside the conduit arrangement 4 of each movable part 2 along a path shown in FIG. 4.

The conduit arrangement 4 of each movable part 2 comprises an inlet conduit 41 and an outlet conduit 42, through which the cooling fluid can respectively enter and exit from the movable part 2. The inlet conduit 41 and the outlet conduit 42 can be connected directly to a supply I and to a discharge or outlet U respectively of an outer flowing circuit of the cooling fluid, of known type and not shown in the Figures.

The conduit arrangement 4 of each movable part 2 furthermore comprises an intermediate conduit 43 that extends around the forming surface 70 of the corresponding movable part 2 between the inlet conduit 41 and the outlet conduit 42.

In particular, the intermediate conduit 43 is curved and extends around the forming surface 70, at a distance from the forming surface 70 that can be almost constant. In the specific case, the forming surface 70 is substantially cylindrical and the intermediate conduit 43 extends along a circumference arc. The distance between the intermediate conduit 43 and the forming surface 70, i.e. the thickness of the corresponding separating wall, is the minimum compatibly achievable with constructional requirements and the resistance limits of the mould. This enables cooling of the preform to be optimised.

The inlet conduit 41 has a supply portion 41a that leads into the intermediate conduit 43; the outlet conduit 42 has a discharge portion 42a that exits from the intermediate conduit 43. The supply portion 41a, the intermediate conduit 43 and the discharge portion 42a are interceptable by a common plane 40 that can be orthogonal to a longitudinal axis Z of the mould.

The conduit arrangement 4 can be symmetrical with respect to a longitudinal plane passing through the longitudinal axis Z and orthogonal to the common plane 40.

The inlet conduit 41 and the outlet conduit 42 have a curved shape to adapt to the conformation of the corresponding movable part 2 and extend from a peripheral zone of the movable part 2 to a zone near the concave region 3. In a version that is not illustrated, the inlet conduit 41 and the outlet conduit 42 can be rectilinear.

The conduit arrangement 4 of each movable part 2 may comprise a supply section 45 suitable for connecting the inlet conduit 41 to the supply I of the cooling fluid. The supply section 45 can be connected to an end of the inlet conduit 41 that is opposite the supply portion 41a. The supply section 45 is almost perpendicular to the inlet conduit 41.

The conduit arrangement 4 may also include a discharge section 46 for connecting the outlet conduit 42 to the outlet U of the outer circuit of the cooling fluid. The discharge section 46 can be connected to an end of the outlet conduit 42 opposite the discharge portion 42a and be nearly perpendicular to the outlet conduit 42.

As shown in FIG. 2, each movable part 2 is obtained by assembling three distinct components, i.e. a base body 73, a closure body 74 and an upper body 75. The base body 73 comprises a central element 76 "C"-shaped, inside which the forming surface 70 is received that delimits the recess 71. The central element 76 extends substantially along the longitudinal axis Z and is provided, in a lower region thereof, with a substantially flat appendage 77. The appendage 77 lies on a transverse, and more in particular orthogonal, plane with respect to the longitudinal axis Z. An edge 78 projects upwards from a perimeter zone of the appendage 77 so as to surround the entire appendage 77. Between the edge 78 and the central element 76 there is defined a housing 79 that is delimited below by the appendage 77.

In the housing 79 the closure body 74 is positioned, that comprises a central part 80, delimited by a "C"-shaped inner surface 82 extending around the longitudinal axis Z. Outside the central part 80 a flange 81 projects, lying on a transverse plane, and more in particular orthogonal to the longitudinal axis Z. On a lower surface of the flange 81a first channel 83, a second channel 84 and a third channel 85 are obtained, third channel 85 being interposed between the first channel 83 and the second channel 84. The first channel 83, the second channel 84 and the third channel 85 have a plan shape corresponding respectively to the plan shape of the inlet conduit 41, of the outlet conduit 42 and of the intermediate conduit 43 and act as precursors to the aforementioned conduits.

The closure body 74 is positioned in the housing 79 of the base body 73, in such a way that the first channel 83 and the second channel 84 face the appendage 77 and the third channel 85 faces the central element 76. The first channel 83, the second channel 84 and the third channel 85 are thus closed by the surfaces of the base body 73 that the first channel 83, the second channel 84 and the third channel 85 face and define respectively the inlet conduit 41, the outlet conduit 42 and the intermediate conduit 43 in which the cooling fluid can flow.

The base body 73 and the closure body 74 are provided, in a central region thereof, respectively with a through hole 86 and with a further through hole 87. When the closure body 74 is arranged inside the housing 79, the further through hole 87 is at the through hole 86.

The flange 81 has outer plan dimensions that are slightly less than the inner perimeter of the edge 78. In this way, when the closure body 74 is positioned inside the housing 79 between the base body 73 and the closure body 74 a slit 88 is defined, shown in FIG. 2.

The through hole 86, the further through hole 87 and the slit 88 are used to fix the base body 73 to the closure body 74, as will be disclosed better below.

The base body 73 and the closure body 74 can be obtained using MIM (Metal Injection Moulding) technology. In this case the base body 73 and the closure body 74 are formed from a mixture of metal powders with a diameter of approximately 10 μm and plastics, a so-called "binder", that acts as a bind.

The mixture is extruded and used to fill a first mould that reproduces the shape of the base body 73 and a second mould that reproduces the shape of the closure body 74. The plastics produces a film around the metal particles, that gives a good cohesion to the metal particles. In this way the precursors of the base body 73 and of the closure body 74 are obtained, having a density equal to approximately 95% of the density of the metal alloy with which the particles are formed. These precursors are rather tender and can be easily processed by a machine tool if it is necessary.

The first channel 83, the second channel 84 and the third channel 85 are obtained directly in the mould that forms the closure body 74.

Subsequently, the base body 73 and the closure body 74, arranged in the housing 79 of the base body 73, are positioned in an auxiliary mould in which, in a closed position, a chamber is defined that reproduces the shape of the movable part 2. The same mixture of metal powders and plastics used for realizing the base body 73 and the closure body 74 is injected into the auxiliary mould. This mixture forms the upper body 75, which is arranged above the base body 73 and the closure body 74 so as to make them integral with one another. Furthermore, the mixture of metal powders and plastics fills the through hole 86, the further through hole 87 and the slit 88, acting in this zones like a sealing fixing substance 89, represented by the colour black in the right-hand side of FIG. 2.

In this way a piece is obtained that is subsequently subjected to a dewaxing process of known type so as to eliminate almost completely the plastics acting as a binder. The dewaxed piece is then treated in autoclave systems in which the dewaxed piece is subjected to high pressures and temperatures so that a sintering process of the metal particles forming the base body 73 the closure body 74 and the upper body 75 occurs. Owing to this sintering process, the metal particles approach one another, get deformed and weld together until they form a single piece provided with great resistance even at the junction zone between the base body 73 and the closure body 74. During the sintering process, the traces of plastics remaining in the movable part 2 after the dewaxing process are eliminated by sublimation. In this way a movable part 2 is obtained that has a density that is substantially equal to 100% of the density of the metal alloy from which the single metal particles are formed.

In an alternative embodiment, the upper body 75 can be made with MIM technology in the manner disclosed above, but using a mixture of metal powders and plastics that is different from that used to make the base body 73 and the closure body 74. In this way it is possible to obtain, in different zones of the movable part 2, physical and chemical properties that are different from one another, according to the mixture of metal and plastics used in the zone in question. It is advisable for the mixture of metal powders and plastics used to form the base body 73 and the closure body 74 to be compatible with the mixture used to form the upper body 75, so that the above bodies can be made integral without heat treatment.

In an embodiment that is not shown, the base body 73 and the closure body 74 obtained through the MIM technology can be joined together only due to the sealing fixing substance 89, without using the upper body 75.

In this case, the base body 73 and the closure body 74 are subjected separately to a dewaxing process, after which the closure body 74 is positioned in the housing 79 of the base body 73. The sealing fixing substance 89, which contains a plurality of metal components, is then injected into the through hole 86, into the further through hole 87 and into the slit 88, that surrounds the entire perimeter of the flange 81. The piece thus obtained is positioned in an autoclave system and subjected to relatively high pressures and temperatures so as to sinter the metallic powders that form the base body 73 and the closure body 74, eliminate the residual traces of binding resin and join the particles that form the sealing fixing substance 89. In this way the closure body 74 is connected to the base body 73.

In another alternative embodiment, the base body 73 and the closure body 74 can be realized without using MIM technology, for example by mechanical processing, and can be subsequently joined by the sealing fixing substance 89 that may comprise an adhesive, a brazing substance, a hardening agent or similar.

It is possible to significantly simplify production of the movable part 2 by realizing the movable part 2 in several components. In particular, it is very easy to make on the closure body 74 and/or on the base body 73 the channels that will form the conduit arrangement 4.

Figure 4:
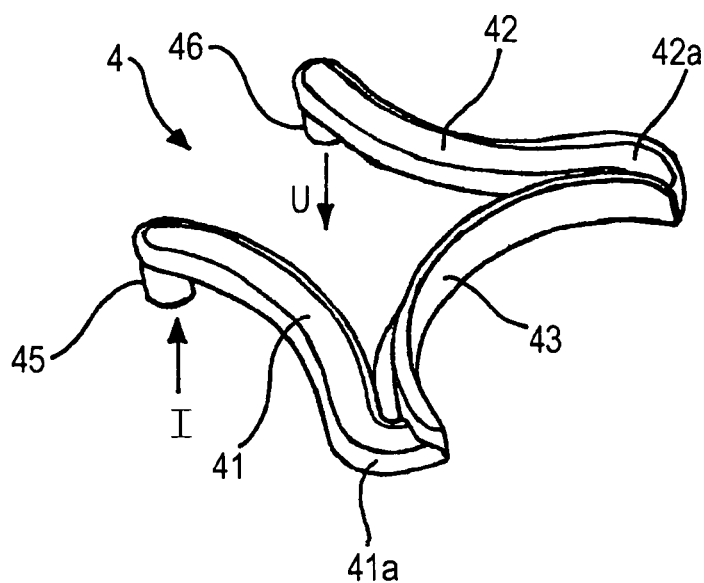
FIG. 4 is a perspective view showing the path of a cooling fluid inside a conduit arrangement provided in a movable part of FIG. 1.
Figure 5:
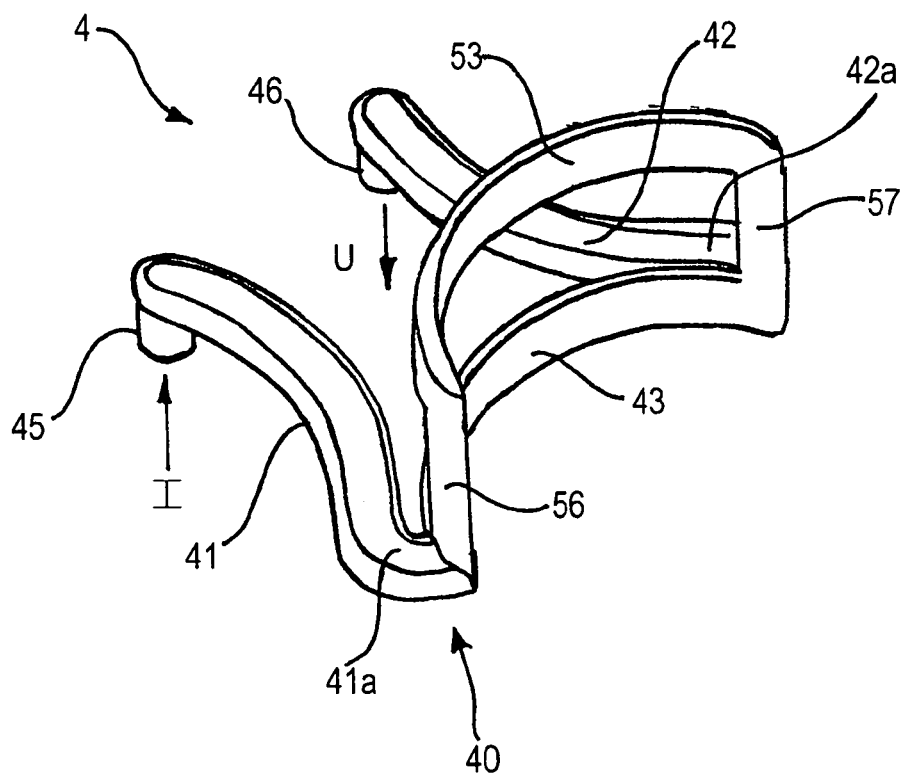
FIG. 5 is a perspective view like the one in FIG. 4, showing the path of the cooling fluid in a conduit arrangement according to a first alternative embodiment.

FIG. 5 illustrates a version of the movable parts 2, in which the conduit arrangement 4 of each movable part 2 comprises, in addition to what has already been disclosed with reference to FIG. 4, a further intermediate conduit 53, arranged around the recess 71 and intersectable by a further plane, for example parallel to the common plane 40. The further intermediate conduit 53, which may have a curved shape, is connected to the inlet conduit 41 through a first connecting conduit 56 and to the outlet conduit 42 through a second connecting conduit 57. In particular, the first connecting conduit 56 and the second connecting conduit 57 lead away respectively from a junction zone between the inlet conduit 41 and the intermediate conduit 43 and from a further junction zone between the outlet conduit 42 and the intermediate conduit 43. Thus the first connecting conduit 56 and the second connecting conduit 57 also connect the intermediate conduit 43 and the further intermediate conduit 53.

The first connecting conduit 56 and the second connecting conduit 57 may be orthogonal to the further intermediate conduit 53 and/or to the common plane 40.

The intermediate conduit 43 and the further intermediate conduit 53 enable preforms necks to be cooled this necks having a relatively long length along the longitudinal axis Z, as occurs for example in the case of preforms intended for forming bottles with great capacity. In fact, the cooling fluid that enters each movable part 2 through the inlet conduit 41 divides into two flows, the first of which passes through the intermediate conduit 43, whereas the second enters the further intermediate conduit 53 through the first connecting conduit 56. The first flow and the second flow, passing respectively into the intermediate conduit 43 and into the further intermediate conduit 53, enable zones of the neck of the preform located at different heights from one another to be cooled. Subsequently, the second flow, after passing through the second connecting conduit 57, exits from the movable part 2 through the outlet conduit 42, in which the second flow joins the first flow.

Figure 6:
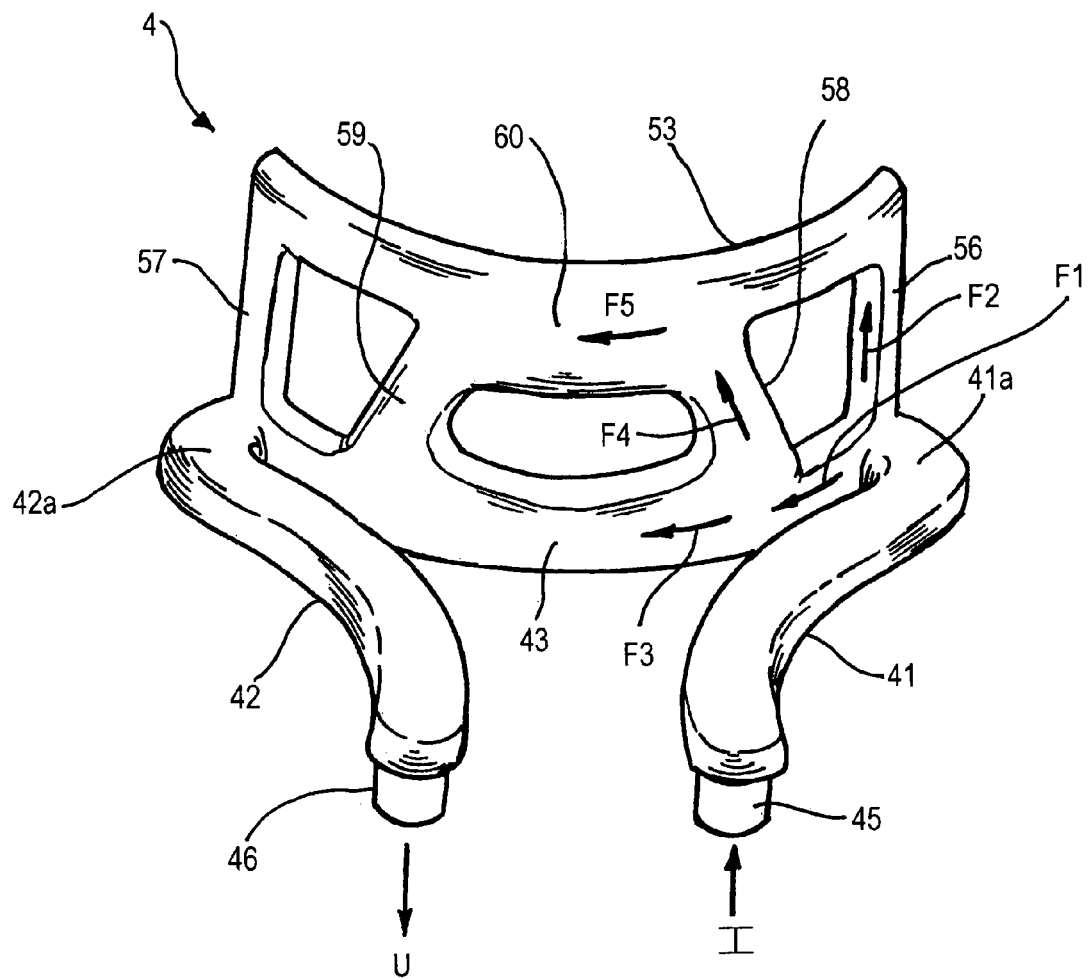
FIG. 6 is a perspective view showing the path of the cooling fluid in a conduit arrangement according to a second alternative embodiment.

The version of the conduit arrangement 4 illustrated in FIG. 6 differs from that in FIG. 5 because the intermediate conduit 43 and the further intermediate conduit 53 are connected together not just by the first connecting conduit 56 and by the second connecting conduit 57 but also by a third connecting conduit 58 and by a fourth connecting conduit 59.

The first connecting conduit 56, the second connecting conduit 57, the third connecting conduit 58 and the fourth connecting conduit 59 have transverse sections that may, for example, be substantially the same as one another. Whilst the first connecting conduit 56 and the second connecting conduit 57 are substantially parallel to the longitudinal axis Z, the third connecting conduit 58 and the fourth connecting conduit 59 are arranged obliquely so as to converge on a central zone 60 of the further intermediate conduit 53.

The cooling fluid coming from the inlet conduit 41 divides into a first flow F1, which enters the intermediate conduit 43, and into a second flow F2, which enters the first connecting conduit 56. The intermediate conduit 43 and the first connecting conduit 56 are dimensioned in such a way that the first flow F1 has a flow rate that is the equivalent of about double the flow rate of the second flow F2. The first flow F1 divides subsequently into a third flow F3, which continues along the intermediate conduit 43, and into a fourth flow F4 that is directed along the third connecting conduit 58 towards the central zone 60 of the further intermediate conduit 53. The third flow F3 and the fourth flow F4 are substantially the same as one another, and the same as the second flow F2, in terms of the flow rate of cooling fluid.

In the central zone 60, the second flow F2 coming from the first connecting conduit 56 joins the fourth flow F4 coming from the third connecting conduit 58, so as to form a fifth flow F5, that is directed to the outlet conduit 42 passing through the second connecting conduit 57 and the fourth connecting conduit 59 in a similar way to what was previously disclosed with reference to the inlet of the cooling fluid. The movable part 2 provided with the conduit arrangement 4 shown in FIG. 6 can be obtained with similar methods to what was disclosed with reference to FIGS. 2 and 3, providing, on the closure body 74 and/or on the base body 73, a suitable network of channels.

It should be noted that whilst the inlet conduit 41, the outlet conduit 42 and intermediate conduit 43 are intercepted by the common plane 40, the further intermediate conduit 53 is intercepted by a further plane, parallel to the common plane 40. Furthermore, the intermediate conduit 43, the further intermediate conduit 53 and the connecting conduits 56, 57, 58 and 59 are intercepted by a substantially semicylindrical surface arranged around the longitudinal axis Z.

The arrangement of the connecting conduits 56, 57, 58 and 59 enables turbulent motion of the cooling fluid to be obtained, which ensures an efficient heat-exchange coefficient between cooling fluid and the preform.

The version of the movable parts 2 illustrated in FIGS. 7 to 9 differs from that in FIG. 5 because the intermediate conduit 43 and the further intermediate conduit 53 are connected together by a plurality of connecting conduits that are substantially parallel to the longitudinal axis Z.

Figure 3:
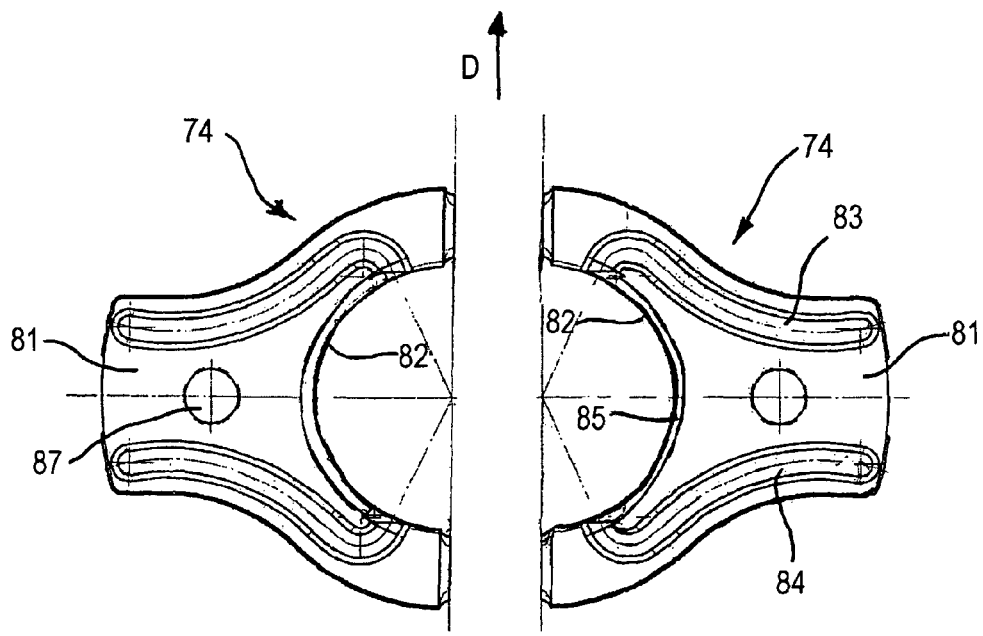
FIG. 3 is a view of two components of the movable parts in FIG. 2, in a spaced configuration, taken from the direction D in FIG. 2.

To obtain a movable part 2 of the type shown in FIGS. 7 to 9, it is possible to use a base body 73 and a closure body 74 of the type disclosed with reference to FIGS. 2 and 3. In this case, on the closure body 74 a lower channel 90 and an upper channel 91 are provided that are parallel to one another and interceptable by respective planes substantially perpendicular to the longitudinal axis Z. The lower channel 90 and the upper channel 91 are connected by a plurality of connecting channels 92, that are substantially parallel to the longitudinal axis Z.

When the closure body 74 is connected to the base body 73, for example through the upper body 75 and the sealing fixing substance 89, the lower channel 90, the upper channel 91 and the connecting channels 92 respectively form the intermediate conduit 43, the further intermediate conduit 53 and the connecting conduits that join the intermediate conduit 43 and the further intermediate conduit 53.

It should be noted that the lower channel 90, like the corresponding intermediate conduit 43, is provided with a central portion of reduced cross section 93, to prevent the cooling fluid that is heading for the outlet conduit 42 through the connecting conduits returning to the inlet conduit 41 by travelling backwards along the intermediate conduit 43.

Figure 10:
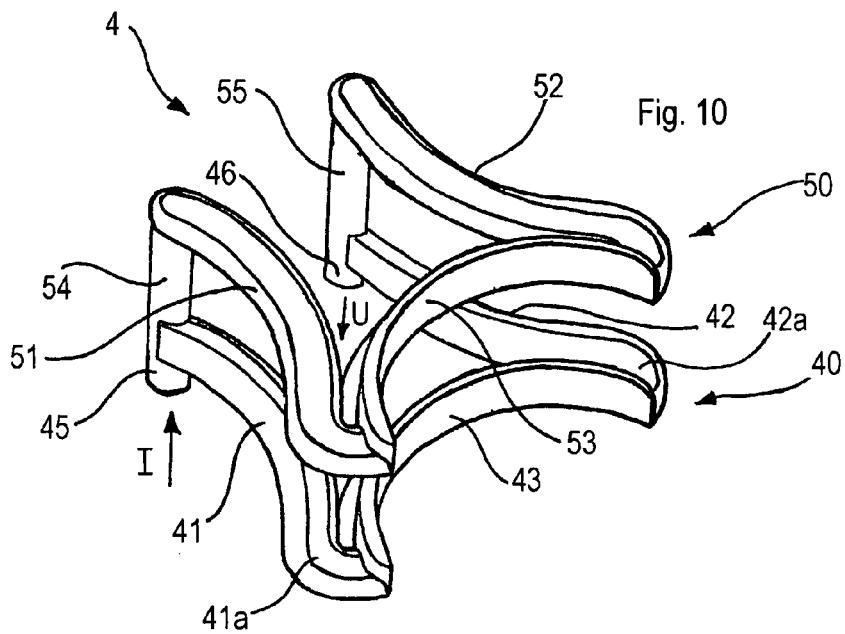
FIG. 10 is a view taken like the one in FIG. 4, showing the path of the cooling fluid in a conduit arrangement according to a third alternative embodiment.

FIG. 10 illustrates an embodiment of the movable part 2 that differs from what is shown in FIG. 5 because there are not the first connecting conduit 56 and the second connecting conduit 57 are not shown that connect the further intermediate conduit 53 to the intermediate conduit 43. In the embodiment in FIG. 10, the further intermediate conduit 53 is interposed between a further inlet conduit 51 and a further outlet conduit 52 of the conduit arrangement 4. The further inlet conduit 51 and the further outlet conduit 52 can be substantially the same as the inlet conduit 41 and the outlet conduit 42 and be intercepted by a further common plane 50 that also intercepts the further intermediate conduit 53. The further common plane 50 is parallel to the common plane 40 and during operation of the mould, is arranged above the common plane 40.

The conduit arrangement 4 shown in FIG. 10 also comprises a first connecting conduit 54, that connects the further inlet conduit 51 to the inlet conduit 41, and a second connecting conduit 55, that connects the further outlet conduit 52 to the outlet conduit 42. In particular, the first connecting conduit 54 connects respective ends of the inlet conduit 41 and of the further inlet conduit 51 that are opposite respective further ends connected to the intermediate conduit 43 and to the further intermediate conduit 53. Similarly, the second connecting conduit 55 connects respective ends of the outlet conduit 42 and of the further outlet conduit 52 that are opposite respective further ends connected to the intermediate conduit 43 and to the further intermediate conduit 53.

The first connecting conduit 54 and the second connecting conduit 55 can be substantially orthogonal to the inlet conduit 41, to the further inlet conduit 51, to the outlet conduit 42 and to the further outlet conduit 52, i.e. perpendicularly to the common plane 40 and to the further common plane 50.

The first connecting conduit 54 and the second connecting conduit 55 can be an extension respectively of the supply section 45 and of the discharge section 46.

The conduit arrangement 4 shown in FIG. 10 enables the cooling fluid to enter the movable part 2 through the supply section 45 and be distributed in a balanced manner in the inlet conduit 41 and in the further inlet conduit 51 and, after travelling along the intermediate conduit 43 and the further intermediate conduit 53, to be discharged through the discharge section 46.

By making the conduit arrangement 4 on two distinct levels or planes it is possible to increase the heat-exchange surface and therefore the quantity of heat that the cooling fluid can remove from the preform, with a consequent increase in cooling speed.

In an embodiment that is not illustrated, the conduit arrangement 4 may not comprise the first connecting conduit 54 and the second connecting conduit 55. In this case, the second inlet conduit 51 and the second outlet conduit 52 are connected directly respectively to the supply I and to the outlet U of the outer flowing circuit of the cooling fluid.

The conduit arrangement 4 may comprise more than two intermediate conduits and possibly more than two inlet and outlet conduits, intercepted by respective common planes, that may be parallel to one another, in function of the dimensions of the movable part 2 i.e. of the concave region 3 to be cooled.

Figure 11:
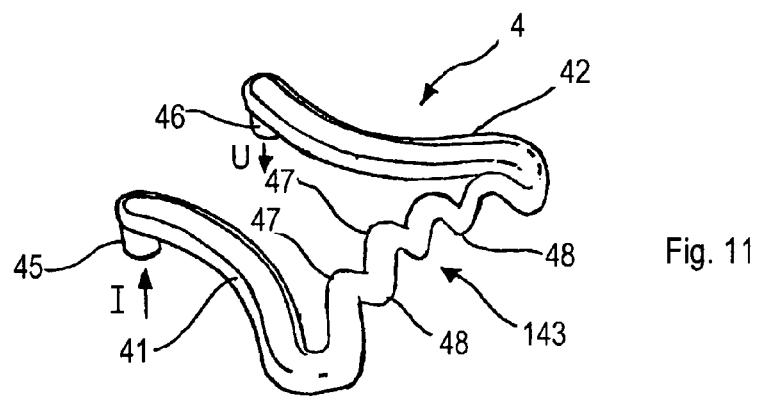
FIG. 11 is a view taken like the one in FIG. 4, showing the path of the cooling fluid in a conduit arrangement according to a fourth alternative embodiment.

In the embodiment shown in FIG. 11, the conduit arrangement 4 comprises an intermediate conduit 143 that extends around the recess 71 with a corrugated shape. The cooling fluid that passes through the intermediate conduit 143 moves along a path defined by a sequence of curved waves. In fact, the intermediate conduit 143 comprises a plurality of curved portions 47, each having a concavity facing downwards, interposed between a plurality of further curved portions 48, each having a concavity facing upwards.

Figure 12:
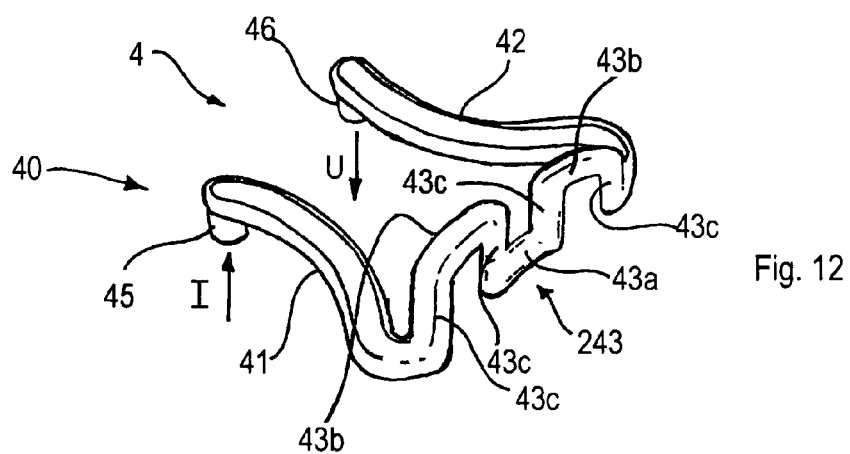
FIG. 12 is a view taken like the one in FIG. 4, showing the path of the cooling fluid in a conduit arrangement according to a fifth alternative embodiment.

In an alternative embodiment, shown in FIG. 12, the conduit arrangement 4 comprising an intermediate conduit 243 that extends around the recess 71 defining an undulating path for the cooling fluid.

This undulating path comprises a sequence of square or rectangular waves. In fact, the intermediate conduit 243 comprises at least a first section 43a that is interceptable by the common plane 40 that intercepts the inlet conduit 41 and the outlet conduit 42. The intermediate conduit 243 furthermore comprises at least a second section 43b that is interceptable by a further plane parallel to the common plane 40. During operation, the common plane 40 is arranged below the further plane that intercepts the second section 43b and extends horizontally. The first section 43a and the second section 43b are connected by at least a third section 43c that may be substantially orthogonal to the common plane 40. In the example in FIG. 12, a first section 43a is provided interposed between two second sections 43b placed at a higher level with respect to the first section 43a.

The first section 43a, the second sections 43b and the third sections 43c are interceptable by a substantially cylindrical surface arranged around the forming surface 70. In other words, the first section 43a and the second sections 43b are arranged in a plan view along a circumference arc.

The undulating shape of the intermediate conduits 143 and 243, determining an increase in the length of the intermediate conduit and therefore an increase in the heat-exchange surface, enables the preform to be cooled in a more efficient manner.

Each of the embodiments of the movable part 2 provided with the conduit arrangement 4 shown in FIGS. 1 to 12 can be made by manufacturing the movable part 2 in at least two components, as disclosed with reference to FIGS. 2, 3 and 7 to 9. In particular, the above-mentioned two components can be obtained by means of MIM technology.

Figure 13:
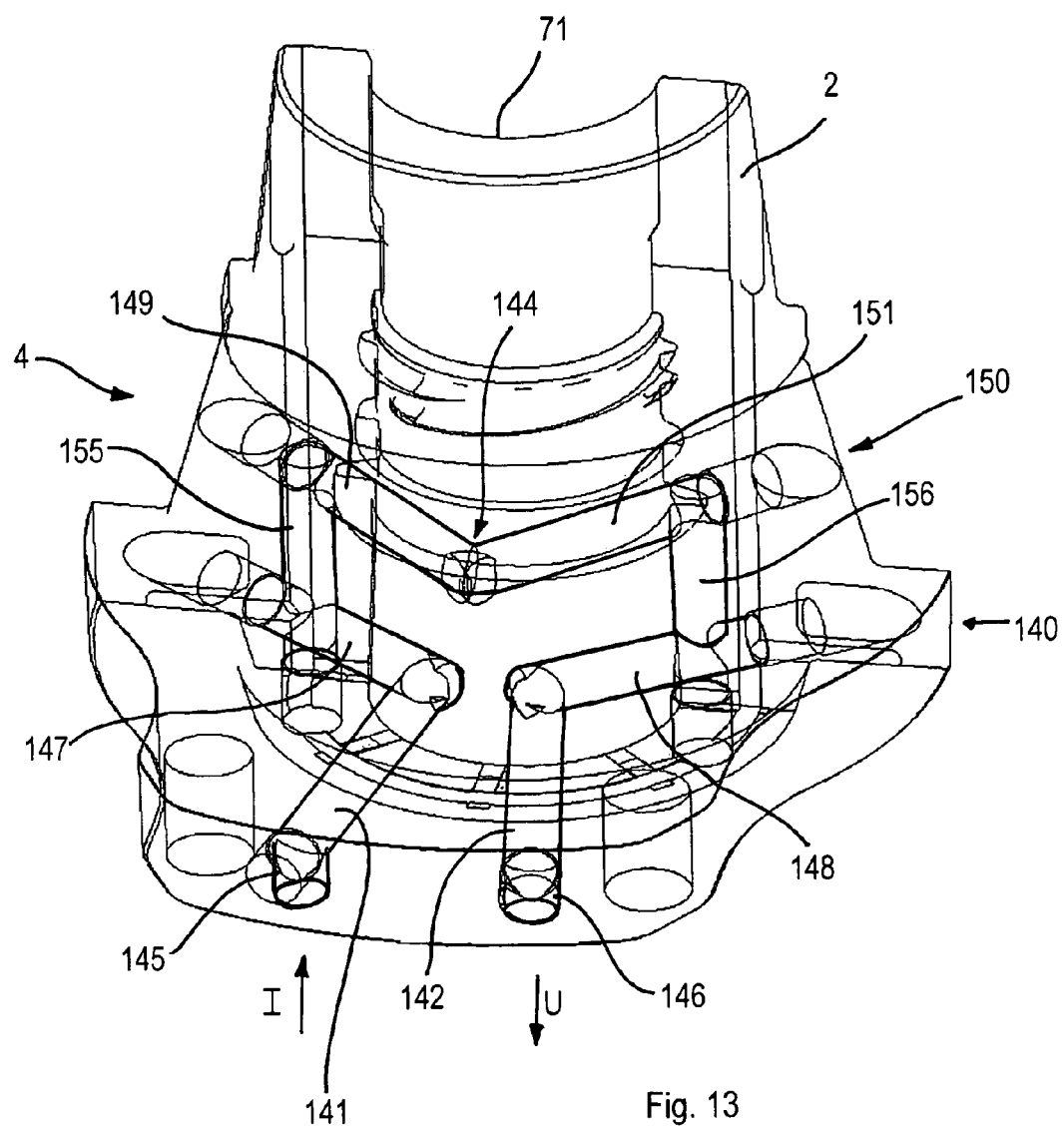
FIG. 13 is a transparent perspective view of a movable part of the type shown in FIG. 1, comprising a rectilinear conduit arrangement.

With reference to FIGS. 13 and 14, a movable part 2 of a mould for obtaining preforms is shown, provided with a conduit arrangement 4 through which a cooling fluid can flow. The conduit arrangement 4 comprises an inlet conduit 141, an outlet conduit 142 and a cooling conduit arrangement 144 that extend between the inlet conduit 141 and the outlet conduit 142 near the recess 71. The cooling conduit arrangement 144 comprises a first lower cooling conduit 147 and a second lower cooling conduit 148, that are intercepted by a common plane 140 that intercepts also the inlet conduit 141 and the outlet conduit 142. In particular, the first lower cooling conduit 147 is connected to the inlet conduit 141, whilst the second lower cooling conduit 148 is connected to the outlet conduit 142.

The cooling conduit arrangement 144 furthermore comprises a first upper cooling conduit 149 connected to a second upper cooling conduit 151. The first upper cooling conduit 149 and the second upper cooling conduit 151 are intercepted by a further common plane 150 parallel to the common plane 140. In other words, the first upper cooling conduit 149 and the second upper cooling conduit 151 are arranged at a higher level than the inlet conduit 141, the outlet conduit 142, the first lower cooling conduit 147 and the second lower cooling conduit 148.

The first lower cooling conduit 147 is connected to the first upper cooling conduit 149 through a joining conduit 155, whilst the second lower cooling conduit 148 is connected to the second upper cooling conduit 151 through a further joining conduit 156. The joining conduit 155 and the further joining conduit 156 may be substantially parallel to the longitudinal axis of the mould, i.e. the joining conduit 155 and the further joining conduit 156 may be for example vertical.

The inlet conduit 141 and the outlet conduit 142 are connected respectively to a supply I and to a discharge U of the cooling fluid, directly or through a supply section 145 and a discharge section 146.

The first lower cooling conduit 147, the second lower cooling conduit 148, the first upper cooling conduit 149, the second upper cooling conduit 151, the joining conduit 155 and the further joining conduit 156 are rectilinear, as is the inlet conduit 141 and the outlet conduit 142. Consequently, the conduits listed above can be made in the movable part 2 by drilling operations to the machine tool and be subsequently closed through respective caps 152.

The conduit arrangement 4 shown in FIGS. 13 and 14 can therefore be made in a relatively easy manner.

The first lower cooling conduit 147, the second lower cooling conduit 148, the first upper cooling conduit 149 and the second upper cooling conduit 151 are parallel to respective straight lines that are tangential to the forming surface 70 and are at a minimum distance from this surface, compatible with the constructional needs and resistance limits of the mould.

In this way, the conduit arrangement 4 of FIGS. 13 and 14 enables the preform to be cooled in a sufficiently efficient manner. Furthermore, as the cooling conduit arrangement 144 is arranged on two levels, it is possible to cool a zone of the neck of the preform having a not insignificant dimension along the longitudinal axis of the mould.

The cooling fluid, which enters the movable part 2 through the inlet conduit 141, is in fact conveyed to the first lower cooling conduit 147 and starts to cool a lower zone of the neck of the preform. Subsequently, the cooling fluid passes to the upper level, traversing the joining conduit 155, and moves to the first upper cooling conduit 149 and then to the second upper cooling conduit 151. Subsequently, by passing through the further joining conduit 156, the cooling fluid returns to the lower level and, after traversing the second lower cooling conduit 148, exits from the movable part 2 through the outlet conduit 142.

With reference to FIG. 15, a mould 1 for obtaining a cap 5 by compression moulding of a dose of plastics is shown. The cap 5 comprises a substantially cylindrical side wall 12, extending around an axis Z1, closed at an end thereof by a bottom wall 13. The side wall 12 is provided with an inner thread 14, suitable for engaging with a corresponding outer thread made on a neck of a container, for example of a bottle. From the bottom wall 13 a sealing lip 15 projects that faces the inside of the cap 5, that is able to engage with an edge of the container so as to close the container in a substantially hermetic manner. The sealing lip 15 is provided with an undercut 108 in a connecting zone between the sealing lip 15 and the bottom wall 13. The cap 5 is furthermore provided with a tamperproof ring 16 connected to an end of the side wall 12 opposite the bottom wall 13. The tamperproof ring 16 is operatively folded towards the inside of the cap 5 and engages with a container collar to be closed in order to enable a user to realise whether the container has already been opened.

The mould 1 comprises a punch device 6 and a die 7 that are movable with respect to one another between a closed position, shown in FIG. 15, in which the dose of plastics is shaped so as to obtain the cap 5, and an open position that is not shown in which the cap 5 that has just been formed can be removed from the punch device 6 and a new dose of plastics can be introduced into the die 7. The latter is provided with a forming cavity 17 for externally shaping the cap 5.

The punch device 6 comprises an inner forming arrangement provided with an inner punch 61, suitable for internally shaping the sealing lip 15 and the bottom wall 13, and an outer forming arrangement provided with an outer punch 62, suitable for internally shaping the side wall 12 and the tamperproof ring 16, and for forming an outer portion of the sealing lip 15. The inner punch 61 and the outer punch 62 are coaxial to one another and the outer punch 62 is internally hollow so as to house the inner punch 61.

Figure 22:
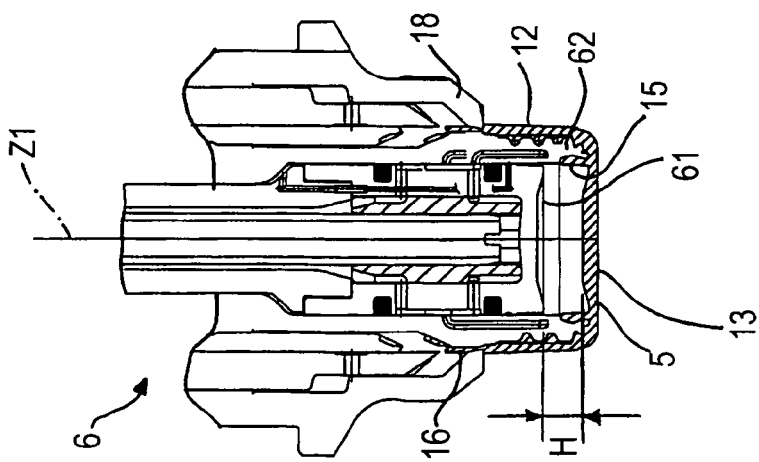
FIG. 22 is a view taken like the one in FIG. 15, illustrating the mould in a first intermediate position.

The outer punch 62 is movable with respect to the inner punch 61 between a forming position, shown in FIG. 15, in which the punch device 6 reproduces the inner shape of the cap 5, and a detached position shown in FIG. 22, in which the outer punch 62 projects towards the die 7 with respect to the inner punch 61. When the outer punch 62 moves from the forming position to the detachment position, the cap 5, and in particular 1a bottom wall 13 and the sealing lip 15, detach from the inner punch 61, so that the cap 5 can be removed subsequently from the punch device 6 through an extracting sleeve 18.

In an embodiment that is not shown, the outer punch 62 can be fixed whilst the inner punch 61 is movable between the detachment position and the forming position.

The inner punch 61 comprises a stem 21, having a tubular shape, that extends along the axis Z1. Outside the stem 21 there is mounted a sleeve 22 arranged in a fixed positioned with respect to the stem 21. Above the sleeve 22 there is provided a supporting element 23, surrounding the stem 21 and arranged in a fixed position with respect to the stem 21. The supporting element 23 is radially distanced from the stem 21. To the supporting element 23 there is connected, for example by means of a brazing zone 24, an inner forming element 25, to an end from which there is obtained a first forming surface 26, suitable for internally shaping the bottom wall 13, and a second forming surface 27, suitable for internally shaping the sealing lip 15.

The punch device 6 comprises a passage arrangement 8 through which a cooling fluid can flow, for example water, for cooling the plastics that forms the cap 5 whilst the latter is formed and for all the time in which the cap 5 remains in the mould 1 in order to stabilise the shape thereof. The passage arrangement 8 comprises a first conduit arrangement 19, made in the inner punch 61, and a second conduit arrangement 20, made in the outer punch 62.

The first conduit arrangement 19 comprises a central conduit 28, obtained in the inside of the stem 21 and extending along the axis Z1. The central conduit 28 is connected to a supply of the cooling fluid and leads into an accumulating chamber 29 defined between the inner forming element 25, the sleeve 22 and the stem 21. The first conduit arrangement 19 furthermore comprises a plurality of delivery conduits 31, that are visible in FIGS. 15 to 17, that extend transversely to the axis Z1, for example perpendicularly to said axis, traversing radially the entire thickness of the inner forming element 25. The delivery conduits 31 can be angularly equidistant in the inner forming element 25 and are interceptable by a common plane that, in the shown example, is substantially horizontal. The delivery conduits 31 lead to the outside of the inner forming element 25 at respective communication channels 32 the function of which will be explained in detail below. Each communication channel 32 has the shape of a slot obtained in an outer surface 33 of the inner forming element 25 and can be substantially parallel to the axis Z1. As shown in FIG. 16, each delivery conduit 31 leads near to a lower end 35 of the respective communication channel 32. The length of each communication channel 32 parallel to the axis Z1 is equal at least to the stroke H (FIG. 22) performed by the outer punch 62 to move from the forming position to the detached position or vice versa.

On the inner forming element 25 there is furthermore obtained a plurality of return conduits 34, each of which traverses the entire thickness of the inner forming element 25. The return conduits 34 extend transversely, for example substantially orthogonal with respect to the axis Z1. They are interceptable by a common plane that, in the specific example shown, is substantially horizontal.

Also the return conduits 34 can be angularly equidistant in the inner forming element 25 and be arranged radially inside this element. In the example in FIGS. 15 to 17, the return conduits 34 are arranged at a higher level than the delivery conduits 31. Furthermore, the delivery conduits 31 and the return conduits 34 are in angularly staggered positions with respect to one another, which means that between two delivery conduits 31 there is interposed a return conduit 34 and vice versa.

The return conduits 34 lead onto the outer surface 33 of the inner forming element 25 at respective further communication channels 36, shaped as slots obtained on the outer surface 33 and which may be, for example, substantially parallel to the axis Z1. As shown in FIGS. 16 and 17, each return conduit 34 terminates near an upper end 37 of the corresponding further communication channel 36. Also the further communication channels 36 have a length, parallel to the axis Z1, almost the same as the stroke H performed by the outer punch 62 to move from the forming position to the detached position or vice versa.

Each return conduit 34 is, in a terminal zone thereof opposite the one leading into the respective further communication channel 36, in fluid communication with an annular chamber 38, shown in FIG. 15, defined between the sleeve 22, the inner forming element 25 and the supporting element 23. The annular chamber 38 communicates in turn with a discharge conduit 39 defined between the stem 21 and the supporting element 23 by means of which the cooling fluid can be removed from the mould 1.

Figure 18:
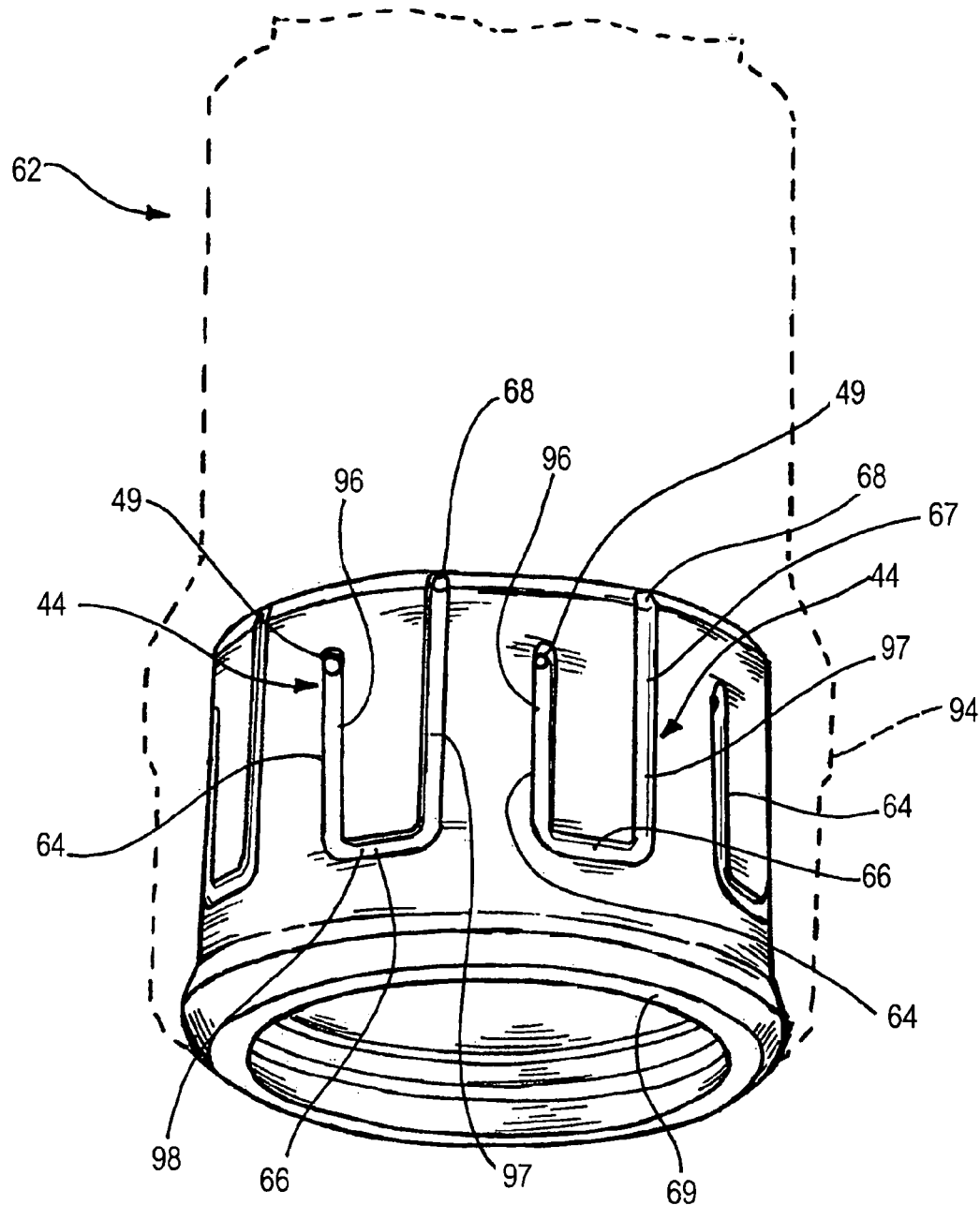
FIG. 18 is a transparent perspective view of an outer punch of the punch device of the mould in FIG. 15.
Figure 19:
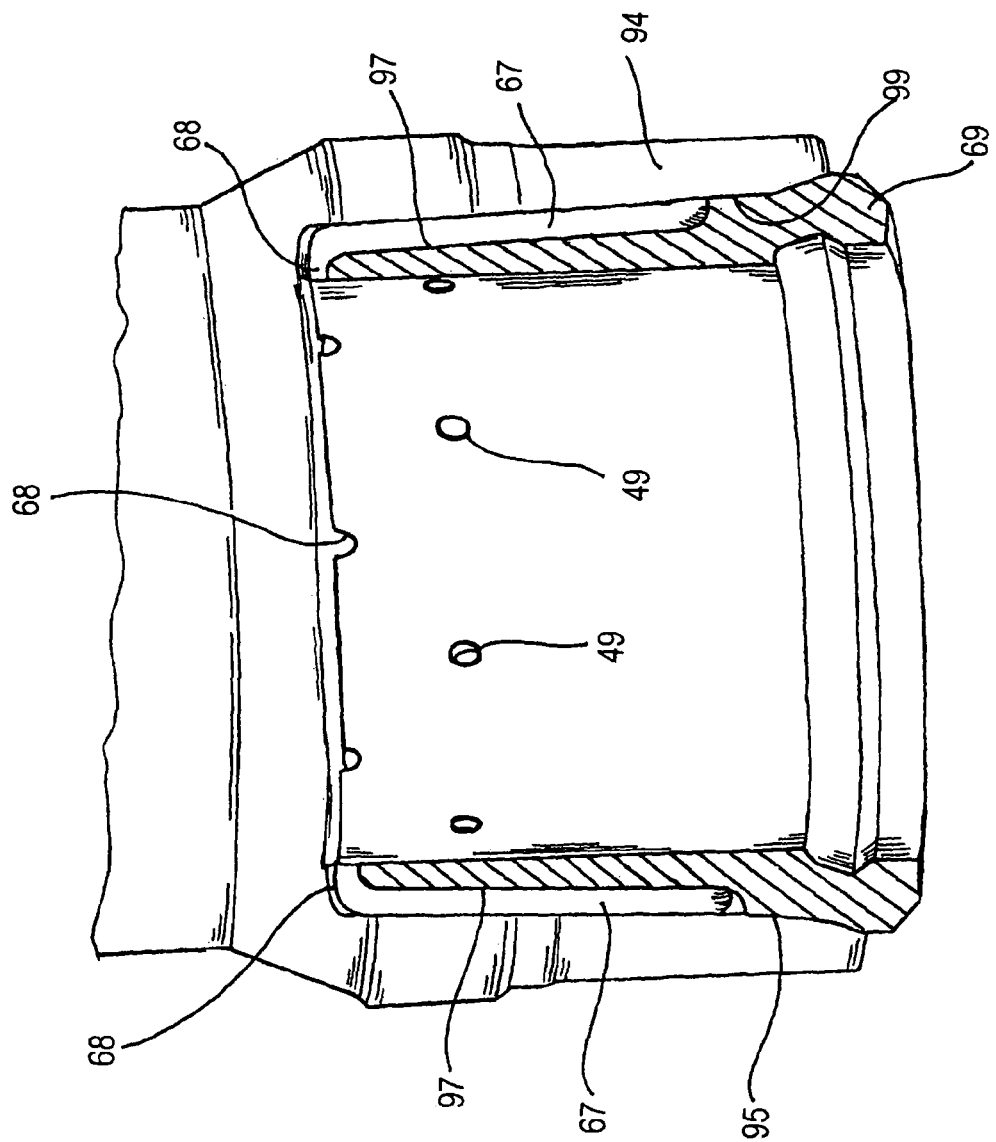
FIG. 19 is an enlarged view showing a detail of FIG. 18.

The second conduit arrangement 20 comprises a plurality of refrigerating conduits 44 obtained in the outer punch 62 that is shown schematically in FIGS. 18 and 19, in which for the sake of simplicity, the zone of the outer punch 62 that forms the inner thread 14 of the cap 5 has not been shown. Each refrigerating conduits 44 comprises a first transverse portion 49, that from an inner surface 63 of the outer punch 62 moves to the outside transversely to the axis Z1, for example perpendicularly to this axis. An inlet portion 64 extends along the axis Z1 starting from the first transverse portion 49 and is directed to a forming end 65 of the outer punch 62. The forming end 65 has the function of shaping an outer portion of the sealing lip 15 and a portion of the inner thread 14 nearer the bottom wall 13. In the example shown, each inlet portion 64 is substantially rectilinear.

Each refrigerating conduit 44 further comprises a joining portion 66, that extends transversely, for example perpendicularly, with respect to the axis Z1. The joining portion 66 is arranged near the forming end 65 and extends along a circumference arc centered on the axis Z1. A first end of each joining portion 66 is connected to the respective inlet portion 64, whilst a second end of each joining portion 66, opposite the aforementioned first end, is connected to a respective outlet portion 67. The latter can be substantially parallel to the inlet portion 64 and then extend along the axis Z1.

A second transverse portion 68 extends transversely to the axis Z1 to the inner surface 63 of the outer punch 62 and is connected to an end of the outlet portion 67 opposite a further end of this portion that communicates with the joining portion 66.

The first transverse portions 49 are interceptable by a first common plane, which is different from a second common plane that intercepts the second transverse portions 68. In the example shown, both the first common plane and the second common plane are substantially horizontal. Furthermore, the first common plane is at a lower level with respect to the second common plane. The joining portions 66 are on the other hand interceptable by a third common plane that, in the example shown, is also horizontal and is arranged below the first common plane. In this way, the assembly comprising an inlet portion 64 and the corresponding joining portion 66 and outlet portion 67 have a "U"-shape provided with two vertical segments of differing length from one another.

The refrigerating conduits 44 follow one another radially around the axis Z1, each inlet portion 64 being interposed between two outlet portions 67. In the example shown, the refrigerating conduits 44 have an angular distance that is the same as one another.

In order to manufacture the refrigerating conduits 44 in the outer punch 62, it is possible to make the outer punch 62 in two parts, i.e. in a first part 69 and in a second part 94, that are visible in FIGS. 18 and 19. The first part 69 is shaped as a sleeve laterally delimited by a frustum-conical surface that engages in a shapingly coupled manner inside the second part 94. In the first part 69 there are obtained the first transverse portions 49 and the second transverse portions 68. On an outer face 95 of the first part 69 a plurality of first grooves 96 and second grooves 97 are furthermore obtained that are parallel to one another and arranged along the axis Z1, and a plurality of third grooves 98, that join each first groove 96 to the corresponding second groove 97. When the first part 69 is inserted inside the second part 94, the first grooves 96, the second grooves 97 and the third grooves 98, closed by an inner face 99 of the second part 94, form respectively the inlet portions 64, the outlet portions 67 and the joining portions 66.

The first part 69 and the second part 94 can be obtained using MIM technology, in which case the first transverse portions 49, the second transverse portions 68, the first grooves 96, the second grooves 97 and the third grooves 98 are formed directly in the mould in which the first part 69 is produced. Alternatively, the first part 69 and the second part 94 can be manufactured with other technologies, for example by mechanical machining on the machine tool or the equivalent.

The first part 69 and the second part 94 are subsequently made integral with one another, interposing between the inner face 99 and the outer face 95 a sealing fixing substance. This substance can be a mixture of metal powders that melt during a sintering step in the autoclave of the first part 69 and of the second part 94, if these parts are obtained using MIM technology. Alternatively, the sealing fixing substance can be a brazing substance or an adhesive.

In an alternative embodiment, the outer punch 62, provided with the refrigerating conduits 44, can be manufactured in an enbloc, for example by a selective laser sintering process (SSL).

On the outer surface 33 of the inner forming element 25 a lower groove 100 and an upper groove 101 are obtained that house respective annular seals 102 which are interposed between the inner forming element 25 and the outer punch 62. In particular, the lower groove 100 is below the delivery conduits 31 and the upper groove 101 is above the return conduits 34, so as to prevent the cooling fluid flowing in the delivery conduits 31 and/or in the return conduits 34 reaching non desired zones leaking between the inner forming element 25 and the outer punch 62.

In the inner punch 61 there is obtained a hole 103 communicating with a source of pressurised gas, for example compressed air, to dispense the gas to the cap 5, after the latter has been formed, in such a manner that the cap 5 can detach more easily from the punch device 6.

The die 7 is provided with a further passage arrangement 11, of known type, through which a cooling fluid can flow, for example water, for externally cooling the cap 5.

During operation, the mould 1 is initially in the opening position in which the die 7 is distanced from the punch device 6, so that it is possible to introduce into the forming cavity 17 a dose of plastics. Subsequently, the die 7 approaches the punch device 6 moving along the axis Z1, until the closed position shown in FIG. 15 is reached. The outer punch 62 is in the forming position with respect to the inner punch 61. In this way, between the die 7 and the punch device 6 there is defined a forming chamber 104 that reproduces the shape of the cap 5. Whilst the mould 1 closes, the dose of plastics is compressed so as to fill all the forming chamber 104 and obtain the cap 5.

The cooling fluid, coming from a source that is not shown, enters the mould 1 through the central conduit 28 and reaches the accumulating chamber 29. As the latter is arranged near the first forming surface 26 of the inner forming element 25, the cooling fluid can first cool from inside the bottom wall 13 of the cap 5.

Figure 20:
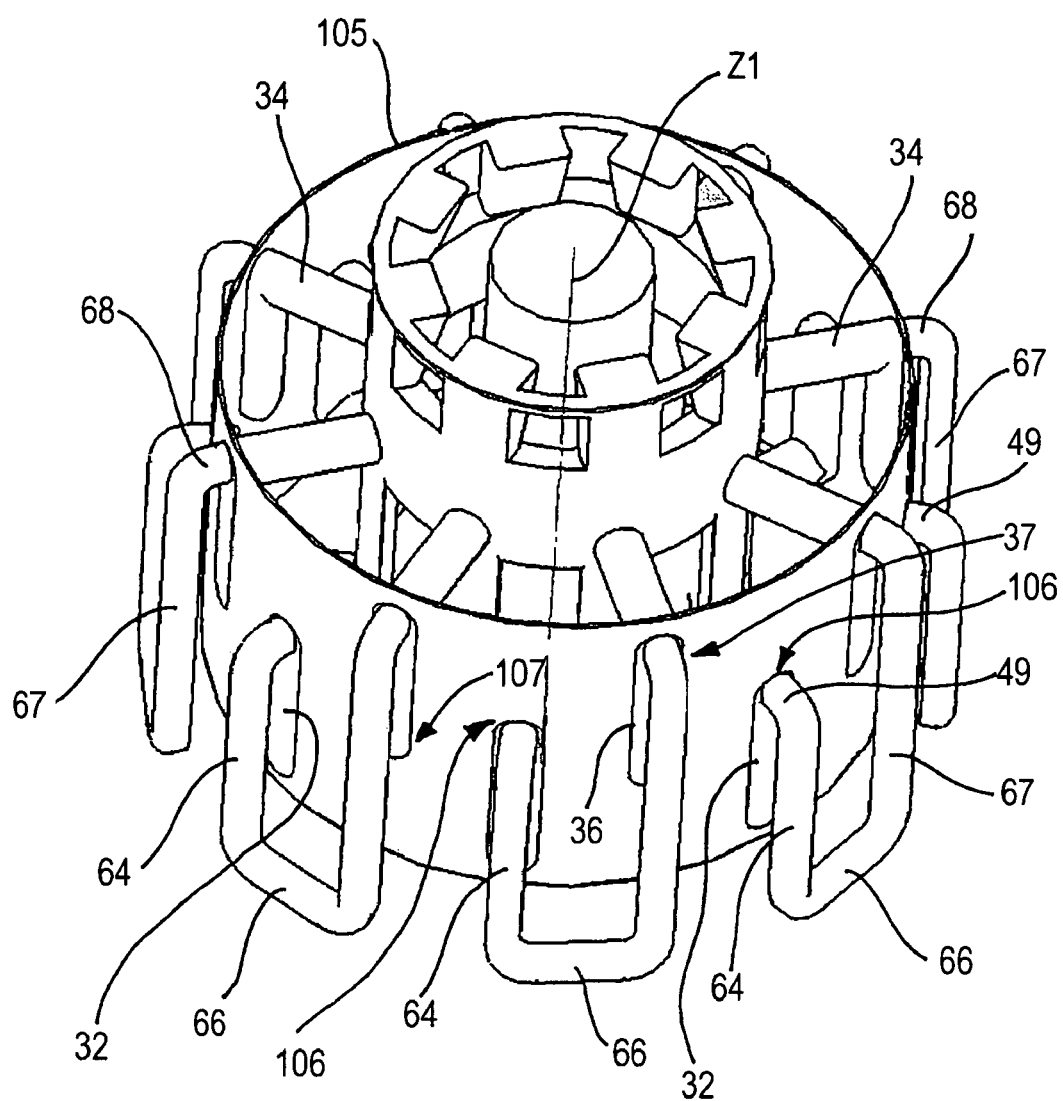
FIG. 20 is a perspective view showing the path of a cooling fluid in the punch device of the mould of FIG. 15, in a forming position.
Figure 21:
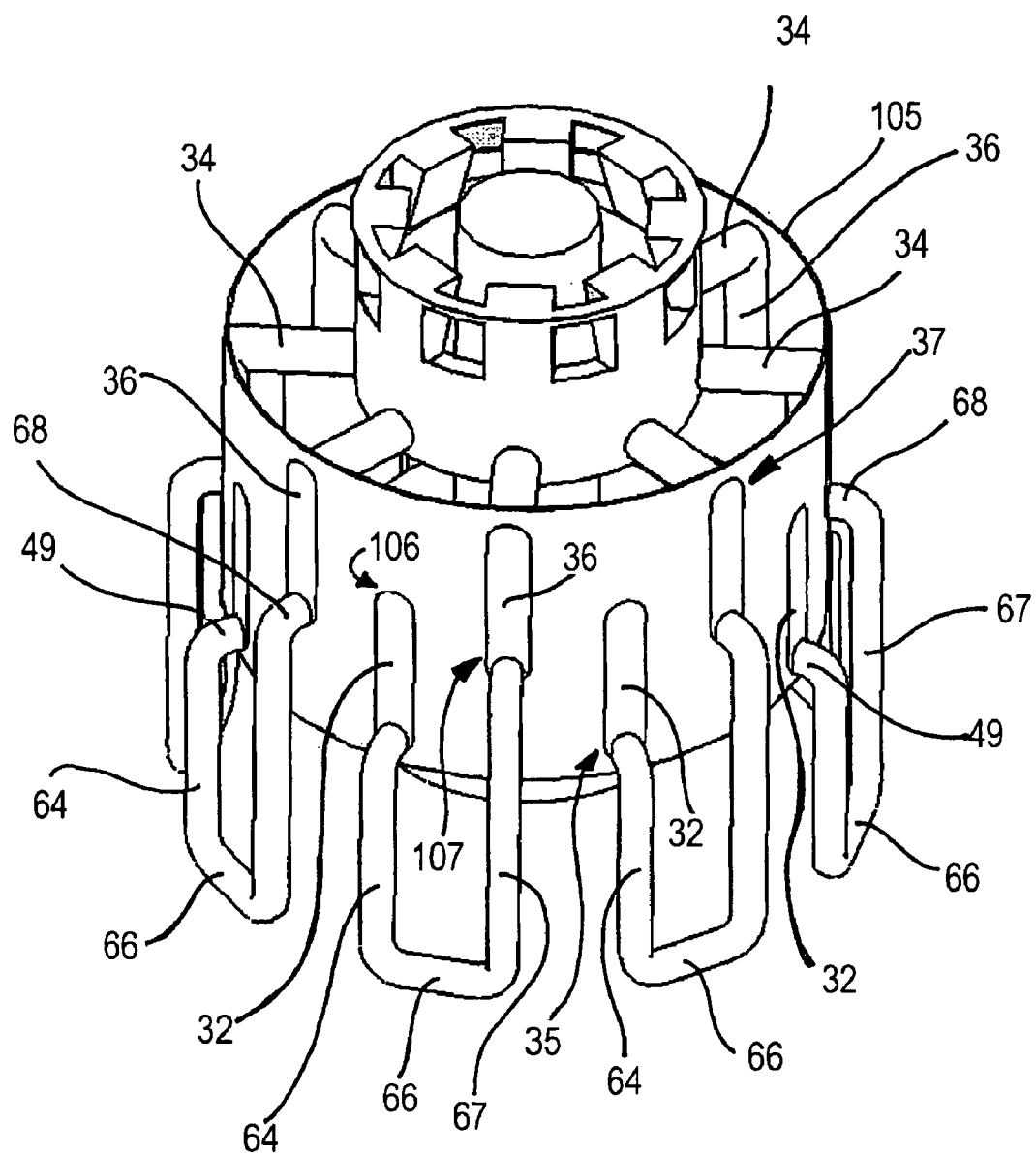
FIG. 21 is a view taken like the one in FIG. 20, in a detached position.

The cooling fluid then exits from the accumulating chamber 29 and moves towards the outer punch 62, passing through the delivery conduits 31. When the cooling fluid reaches the outer surface 33 of the inner forming element 25, the cooling fluid fills the communication channels 32 and also spreads into an intervening space 105 which is defined between the inner punch 61 and the outer punch 62 and delimited along the axis Z1 by the annular seals 102. The intervening space ** 105 is shown in FIGS. 20 and 21, in which it appears filled with the cooling fluid.

From the communication channels 32, the cooling fluid enters the outer punch 62 passing through the first transverse portions 49. It should be remembered that in the forming position, to which FIG. 20 refers, the first transverse portions 49 face respective upper end zones 106 of the communication channels 32 and are therefore in fluid communication with corresponding delivery conduits 31.

Subsequently, the cooling fluid traverses the inlet portions 64 and reaches near the forming end 65, which cools passing through the joining portions 66. Then the cooling fluid leaves the outer punch 62 after travelling through the outlet portions 67 and the second transverse portions 68.

From the second transverse portions 68 the cooling fluid passes into the further communication channels 36 and then enters the inner punch 61 through the return conduits 34. It should be noted that in the forming position the second transverse portions 68, as shown in FIG. 20, faces the upper ends 37 of the respective further communication channels 36 so as to be in fluid communication with respective return conduits 34.

Owing to the refrigerating conduits 44 it is possible, particularly when the cooling fluid flows in the joining portions 66, to effectively cool the sealing lip 15 and the portions of the inner thread 14 nearer the bottom wall 13. Furthermore, it is possible to cool from the inside the entire side wall 12, near which are arranged the inlet portions 64 and the outlet portions 67. Lastly, the outlet portions 67 and the second transverse portions 68 enable also the tamperproof ring 16 to be cooled from the inside.

From the return conduits 34, the cooling fluid moves to an outlet that is not shown through the annular chamber 38 and the discharge conduit 39.

The mould 1 is kept in the closed position for a period of time necessary for cooling the cap 5 and for stabilising the geometrical shape thereof. During this period of time, the cap 5 shrinks because the plastics that constitutes the cap 5 undergoes a reduction in volume as it cools. The mould 1 comprises compensating devices of known type that ensure that despite the shrinkage of the cap 5 the die 7, the inner punch 61 and the outer punch 62 keep in contact with the plastics that constitutes the cap 5 and continue to compress the plastics. The die 7, the inner punch 61 and the outer punch 62 can thus remove heat from the cap 5 for all the time in which the mould 1 remains in the closed position.

When the cap 5 has been formed and sufficiently cooled, the die 7 is moved in a rectilinear manner along the axis Z1 so as to move away from the punch device 6 to reach the opening position. A driving device that is not shown, comprising for example a cam, moves to die 7 and along the axis Z1 the extracting sleeve 18, that drags with it the cap 5 with which the extracting sleeve 18 is engaged at a connecting zone between the side wall 12 and the tamperproof ring 16. As, owing to the inner thread 14, the cap 5 is connected to the outer punch 62, also the latter is dragged by the extracting sleeve 18 to the die 7, overcoming the force exerted by the elastic device that tends to keep the outer punch 62 in the forming position. The detached position shown in FIG. 22 is thus reached, in which the bottom wall 13 has detached from the first forming surface 26 of the inner punch 61 and the sealing lip 15 has detached from the second forming surface 27. Through the hole 103 a jet of compressed air is dispensed that helps the cap 5 to detach from the inner punch 61 thus preventing a suction effect from being created.

Figure 24:
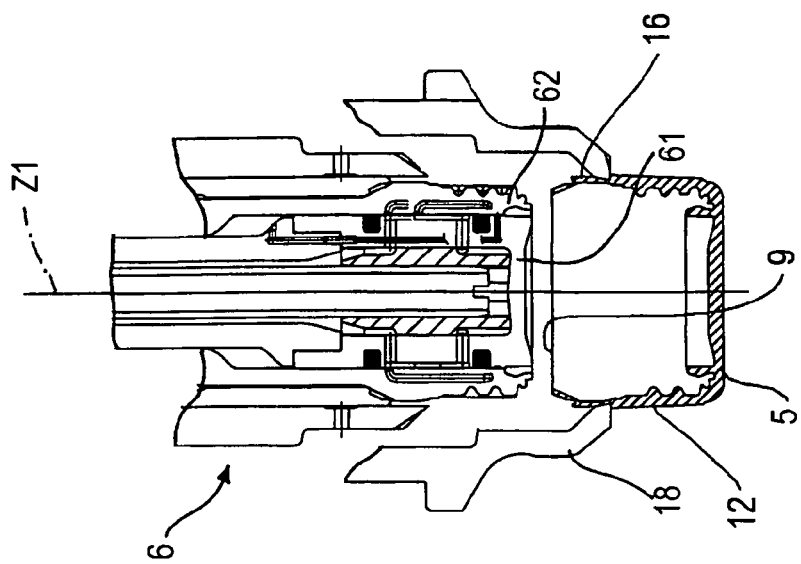
FIG. 24 is a view taken like the one in FIG. 15, illustrating the mould in an extracting position.
Figure 23:
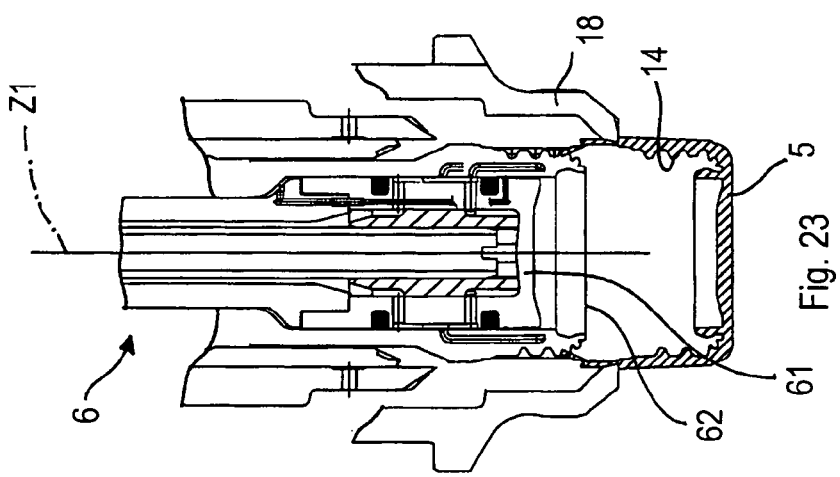
FIG. 23 is a view taken like the one in FIG. 15, illustrating the mould in a second intermediate position.

When the outer punch 62 has reached the detached position, the extracting sleeve 18, together with the cap 5, continues to approach the die 7. The outer punch 62 remains on the other hand stationary with respect to the inner punch 61, being locked in the detached position by a stopping arrangement that is not shown. As the extracting sleeve 18 moves integrally with the cap 5, the inner thread 14 of the cap 5 disengages from the outer punch 62, as shown in FIG. 23. Subsequently, as shown in FIG. 24, the outer punch 62 returns to the forming position in which the outer punch 62 no longer protrudes from the inner punch 61, whilst the cap 5 remains associated with the extracting sleeve 18 through an undercut region arranged in an outer portion of the tamperproof ring 16. The extracting sleeve 18 is moved along the axis Z1 so as to move away from the die 7 and drags with it the cap 5, until an upper edge 9 of the tamperproof ring 16 abuts against the outer punch 62. The tamperproof ring 16, now being locked in contact with the outer punch 62, deforms elastically and disengages from the extracting sleeve 18, which on the other hand continues to raise. At this point the cap 5 is completely separate from the punch device 6 and can be moved away from the mould 1 by means of a removing device that is not shown.

The mould 1 shown in FIGS. 15 to 24 is particularly suitable for forming caps 5 in which the tamperproof ring 16 is joined to the side wall 12 by means of a continuous joining strip, as usually occurs in compression moulding, and, in certain cases, also in injection moulding. In the caps 5 provided with a continuous joining strip, which is provided with relatively high mechanical resistance, the tamperproof ring 16 can be disengaged from the extracting sleeve 18 as disclosed previously, without risking breaking the joining strip whilst the tamperproof ring 16 is deformed in contact with the outer punch 62.

In a device that is not shown downstream of the apparatus on which the moulds 1 are mounted, the continuous joining strip arranged between the tamperproof ring 16 and the side wall 12 will be cut at a plurality of points, so that the tamperproof ring 16 remains joined to the side wall 12 at a plurality of joining portions suitable for being broken by a user when the container closed by the cap 5 is opened for the first time.

It is also noted that when the outer punch 62 is in the detached position, the cooling fluid continues to flow inside the punch device 6 in the manner disclosed previously with reference to forming position. In fact, as shown in FIG. 21, in the detached position the first transverse portions 49 of the refrigerating conduits 44 face the respective lower ends 35 of the communication channels 32, near which the delivery conduits 31 end.

Similarly, the second transverse portions 68 face respective lower end regions 107 of the further communication channels 36, so that the cooling fluid coming from the refrigerating conduits 44 can reach the return conduits 34 after travelling through further communication channels 36 for the entire length thereof. Furthermore, the cooling fluid is also inside the intervening space 105, that contributes to cooling the punch device 6.

The cooling fluid flowing in the outer punch 62 can thus continue to cool the side wall 12 and the sealing lip 15 also in the detached position. This enables the shape of the cap 5 to be stabilised rapidly, so that the extracting sleeve 18 can subsequently remove from the outer punch 62 the cap 5 without damaging it.

Figure 25:
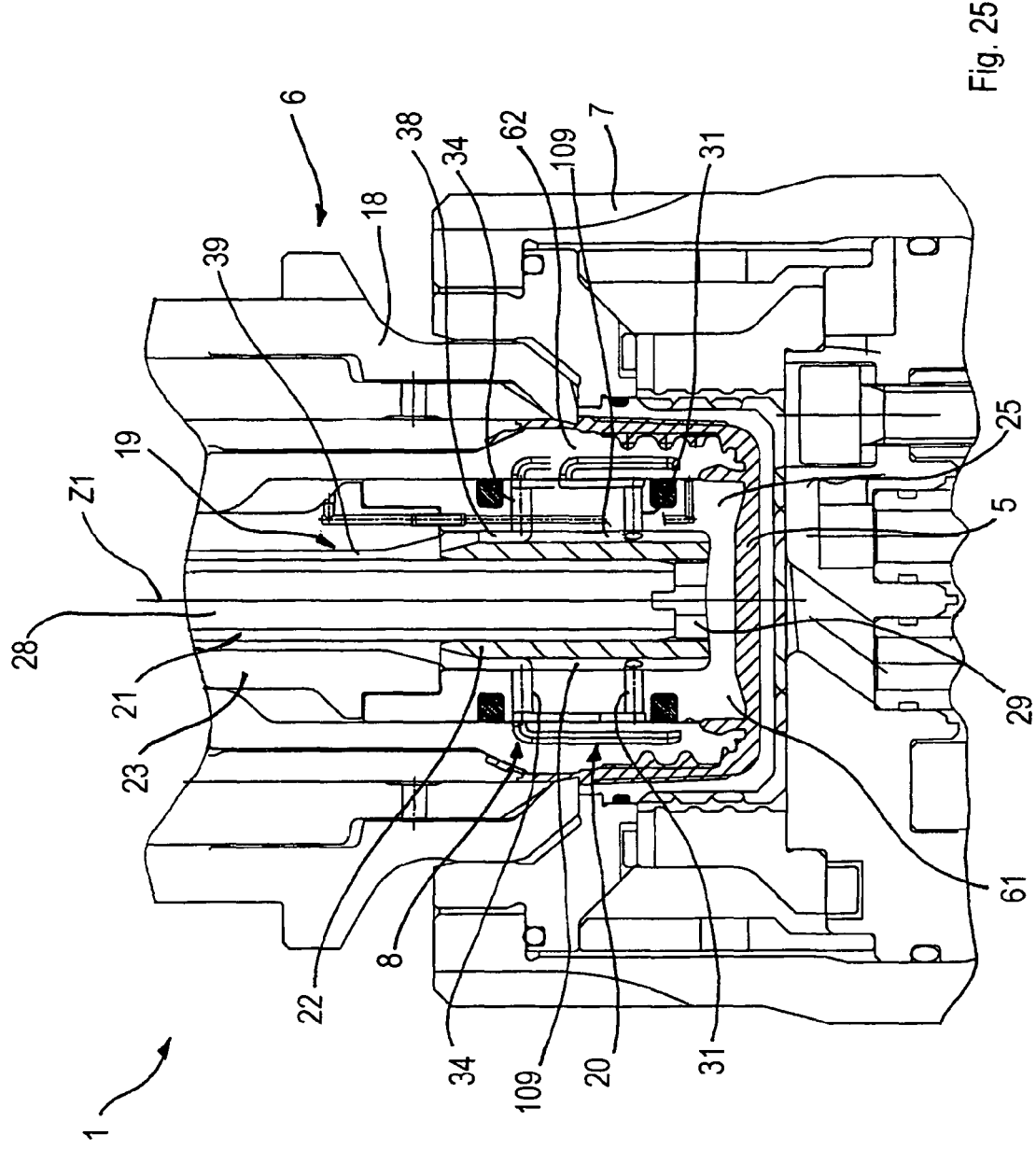
FIG. 25 is a view taken like the one in FIG. 15, showing a mould according to an alternative embodiment.

In an alternative embodiment, shown in FIG. 25, the sleeve 22 is provided, on the outer surface thereof, with a plurality of longitudinal grooves 109 that can be substantially parallel to the axis Z1. The longitudinal grooves 109 are arranged around the axis Z1 in a staggered position with respect to delivery conduits 31 and to the return conduits 34. In other words, each longitudinal groove 109 is interposed, in a plan view, between the delivery conduit 31 and the following return conduit 34.

When the sleeve 22 is mounted inside the inner forming element 25, the longitudinal grooves 109 define a plurality of longitudinal passages that connect the accumulating chamber 29 with the annular chamber 38.

During operation, the cooling fluid enters the accumulating chamber 29 through the central conduit 28. From the accumulating chamber 29, a first part of the cooling fluid enters the delivery conduits 31 and then reaches the outer punch 62, as disclosed with reference to FIGS. 15 and 20. After cooling the outer punch 62, the first part of the cooling fluid returns to the inner punch 61, where the first part of the cooling fluid traverses the return conduits 34 and subsequently exits from the mould 1 through the annular chamber 38 and the discharge conduit 39.

A second part of the cooling fluid which is in the accumulating chamber 29 flows directly through the longitudinal grooves 109 into the annular chamber 38, without reaching the outer punch 62, after which the second part of the cooling fluid comes out from the mould 1 through the discharge conduit 39. The second part of the cooling fluid enables the inner punch 61 to be cooled from the exterior and the temperature of the punch device 6 to be kept lower, which improves removal of heat from the cap 5.

Lastly, it should be noted that the arrangement of the first conduit arrangement 19 and of the second conduit arrangement 20 shown in FIGS. 15 to 25 can also be used in a mould for obtaining caps 5 by injection moulding.

Figure 26:
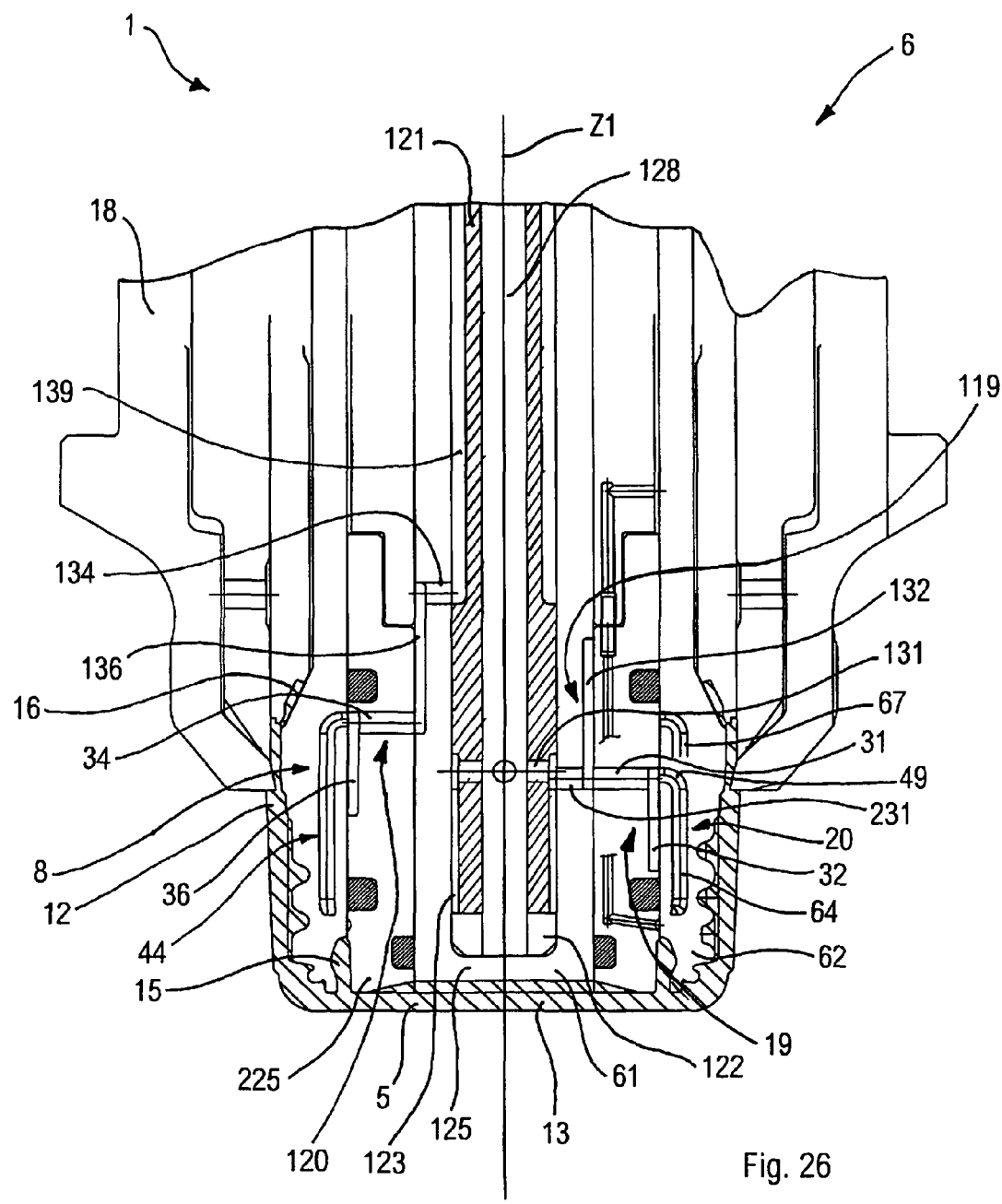
FIG. 26 is a partially sectioned view, showing a mould for producing caps according to an alternative embodiment in a closed position.
Figure 27:
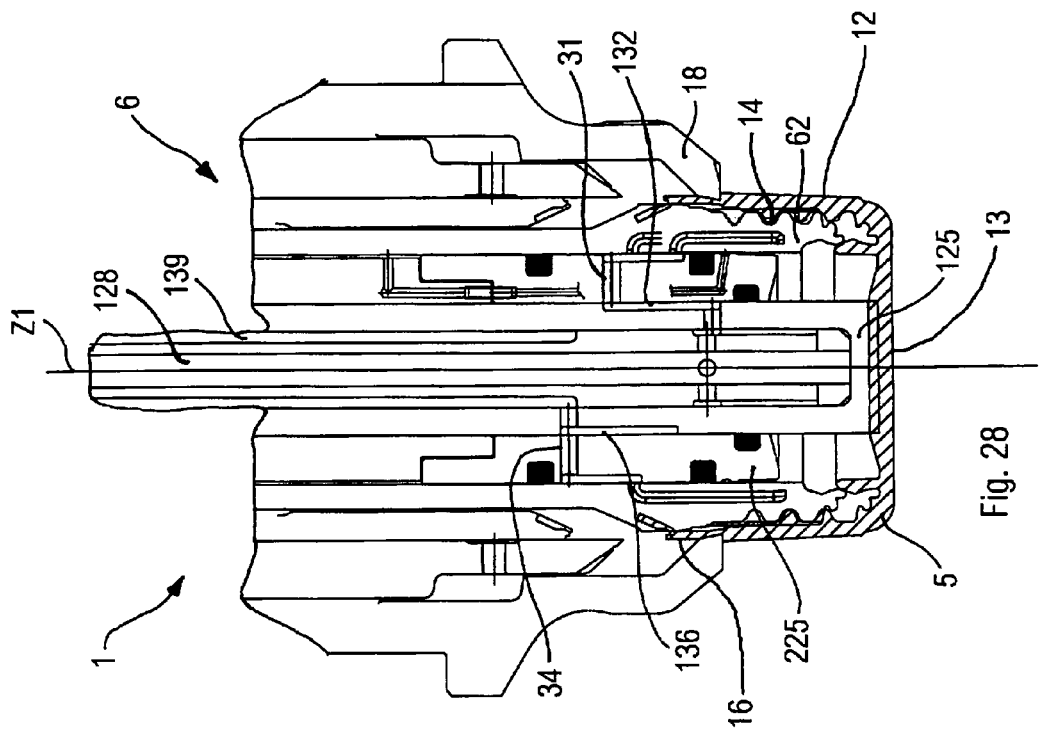
FIG. 27 is a view taken like the one in FIG. 26, that shows the mould in a detached position.
Figure 28:
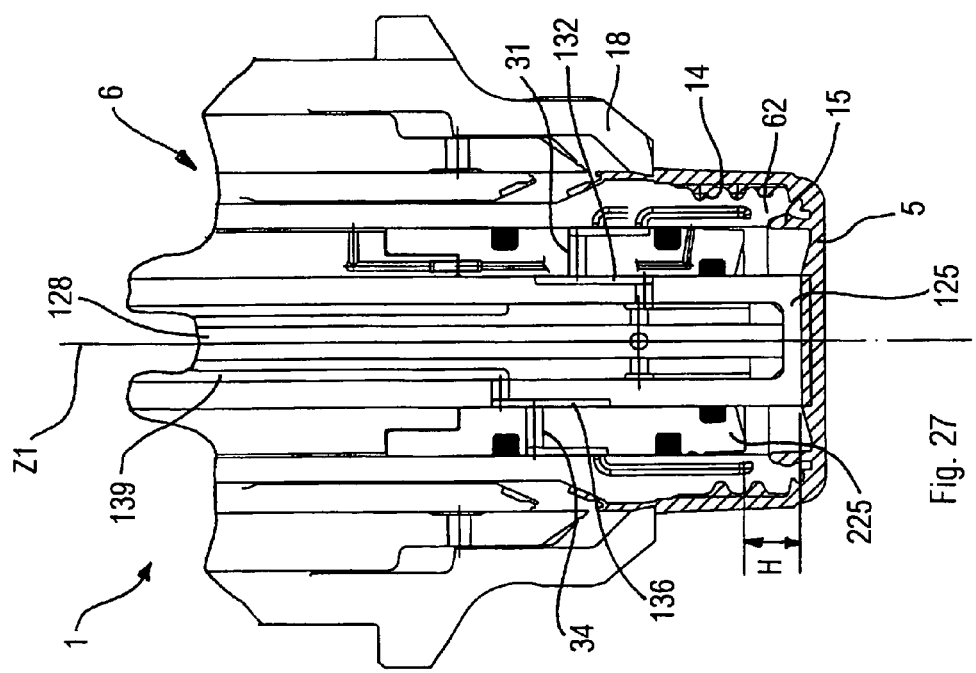
FIG. 28 is a view taken like the one in FIG. 26, in which an outer punch of the mould disengages from an inner thread of the cap.

With reference to FIGS. 26 to 28, an alternative embodiment of the mould 1 usable particularly for producing caps 5 by injection moulding is shown. The components of the mould 1 shown in FIGS. 26 to 28 and common to what has been previously disclosed with reference to FIGS. 15 to 24 are indicated by the same reference numbers without being again disclosed in detail.

As shown in FIG. 26, the inner punch 61 comprises a first forming element 125 and a second forming element 225. The first forming element 125 enables a central portion of the bottom wall 13 to be shaped. The second forming element 225 is on the other hand used to shape internally the sealing lip 15 and a peripheral portion of the bottom wall 13. The first forming element 125 and the second forming element 225 are coaxial to one another, inasmuch as they both extend along the axis Z1. The second forming element 225 is internally hollow, so as to house the first forming element 125 therein. Whilst the second forming element 225 is fixed axially, the first forming element 125 is movable along the axis Z1 owing to a driving arrangement that is not shown that is synchronised with a further driving arrangement that moves the extracting sleeve 18.

The inner punch 61 is provided with a first conduit arrangement 19 comprising a first network of conduits 119, obtained in the first forming element 125, and a second network of conduits 120, obtained in the second forming element 225.

The first network of conduits 119 comprises a central conduit 128, extending along the axis Z1, obtained in a stem 121 fixed inside the first forming element 125. Through the central conduit 128 a cooling fluid, for example water, can enter the inside of the punch device 6. The central conduit 128 is in fluid communication with a plurality of further delivery conduits 131, obtained in the stem 121 transversely to the axis Z1. In turn, the further delivery conduits 131 communicate with respective still further delivery conduits 231 obtained in the first forming element 125 and also arranged transversely to the axis Z1. The still further delivery conduits 231 lead into at respective second communication channels 132 obtained on an outer surface of the first forming element 125 and extending along the axis Z1. The second communication channels 132 face the delivery conduits 31 obtained on the second forming element 225, that have already been disclosed with reference to FIGS. 15 to 24.

The stem 121 is provided, at a lower end thereof, with a plurality of spaces 122 connected to the central conduit 128. The spaces 122 lead into an interspace 123 defined between the stem 121 and the first forming element 125. The interspace 123 is in fluid communication with the further delivery conduits 131 and with the still further delivery conduits 231.

The first forming element 125 is furthermore provided, on the outer surface thereof, with a plurality of second further communication channels 136, that are staggered with respect to the second communication channels 132. The second further communication channels 136 are in fluid communication with the return conduits 34 obtained on the second forming element 225, which are completely similar to those disclosed with reference to FIGS. 15 to 24.

The second communication channels 132 and the second further communication channels 136 are shaped as grooves having a length, measured parallel to the axis Z1, that is almost equal to the stroke of the first forming element 125 with respect to the second forming element 225.

A plurality of further return conduits 134, that extend through the thickness of the first forming element 125 transversely to the axis Z1, connect the second further communication channels 136 to a discharge conduit 139 defined between the stem 121 and the first forming element 125.

The further delivery conduits 131, the still further delivery conduits 231, the second communication channels 132, the second further communication channels 136 and the further return conduits 134 are included in the first network of conduits 119. The delivery conduits 31, the communication channels 32, the further communication channels 36 and the return conduits 34 are on the other hand included in a second network of conduits 120.

The outer punch 62 has a structure completely similar to what was previously disclosed with reference to FIGS. 15, 18 and 19.

When it is necessary to form the cap 5, the outer punch 62, the first forming element 125 and the second forming element 225 are arranged in the position shown in FIG. 26 and cooperate with a die that is not shown. The cooling fluid enters inside the stem 121 through the central conduit 128 and, by passing through the further delivery conduits 131 and the still further delivery conduits 231, reaches at the outer surface of the first forming element 125. From here the cooling fluid passes into the second communication channels 132, having respective lower end portions that, in the position in FIG. 26, face the delivery conduits 31. After entering the second forming element 225 through the delivery conduits 31, the cooling fluid reaches the outer punch 62 and cools the latter by passing through the refrigerating conduits 44, in a completely similar manner to what was previously disclosed with reference to FIGS. 15 to 24.

A part of the cooling fluid entering the stem 121 through the central conduit 128 reaches the spaces 122 and from here it spreads into the interspace 123, after which it moves towards the outer punch 62 passing through the still further delivery conduits 231. This part of the cooling fluid enables both the surface of the first forming element 125 that shapes internally the bottom wall 13 of the cap 5 and the lateral surface of the first forming element 125 to be cooled.

From the outer punch 62, the cooling fluid returns to the second forming element 225 through the return conduits 34. The latter, in the position in FIG. 26, face respective further lower end portions of the second further communication channels 136. This enables the cooling fluid to reach, through the second further communication channels 136 and the further return conduits 134, the discharge conduit 139 to leave the mould 1.

When the cap 5 has been formed and sufficiently cooled, the die is moved away from the punch device 6. The extracting sleeve 18 and the first forming element 125 are driven along the axis Z1 two the die and go to the detached position shown in FIG. 27, in which the sealing lip 15 is detached from the forming element 225. The cap 5, moved by the extracting sleeve 18, drags towards the die the outer punch 62, which is associated with the cap 5 by means of the inner thread 14, overcoming the resistance of an elastic device that is not shown that acts on the outer punch 62.

It should be noted that in the detached position shown in FIG. 27, the delivery conduits 31 face an intermediate zone of the second communication channels 132 and are therefore in communication with the central conduit 128. Similarly, the return conduits 34 communicate with the discharge conduit 139 facing an intermediate zone of the second further communication channels 136. In the outer punch 62, the cooling fluid flows in a similar manner to what has been disclosed with reference to FIG. 22.

After reaching the detachment position shown in FIG. 27, the outer punch 62 stops, being locked by an abutting arrangement that is not shown. The extracting sleeve 18 and the first forming element 125 on the other hand continue to move along the axis Z1 to the die, so as to disengage the inner thread 14 from the outer punch 62, as shown in FIG. 28.

It should be noted that in the position shown in FIG. 28, the delivery conduits 31 face respective upper end portions of the second communication channels 132 and are thus in fluid communication with the central conduit 128. Similarly, the return conduits 34 communicate with the discharge conduit 139, the return conduits 34 being faced with corresponding further upper end portions of the second further communication channels 136.

This enables cooling of the cap 2 to be continued whilst the latter disengages from the outer punch 62.

Whilst the first forming element 125 is stopped in the position shown in FIG. 28, the extracting sleeve 18 continues to move to the die, so as to disengage completely the inner thread 14 from the outer punch 62. The cap 5 remains associated with the extracting sleeve 18 through an undercut zone arranged in an outer portion of the tamperproof ring 16. Subsequently the extracting sleeve 18 is moved again along the axis Z1 moving the extracting sleeve 18 away from the die, and the extracting sleeve 18 drags the cap 5, until an upper edge of the tamperproof ring 16 abuts on the outer punch 62. At this point, whilst the extracting sleeve 18 continues to move upwards, the tamperproof ring 16 is elastically deformed and disengages from the extracting sleeve 18.

The embodiment of the mould 1 shown in FIGS. 26 to 28 is particularly suitable when, inside the mould 1, a cap 5 is formed in which the tamperproof ring 16 is joined to the side wall 12 by means of a plurality of joining portions provided with relatively high resistance. In this case the tamperproof ring 16 can be removed from the extracting sleeve 18 as disclosed previously without risking damaging the joining portions. This occurs in certain cases in injection moulding and more rarely in compression moulding.

If on the other hand inside the mould 1 a cap 5 is formed in which the tamperproof ring 16 is joined to the side wall 12 through a plurality of relatively weak joining portions, as occurs frequently in injection moulding, it is possible to use an embodiment of the mould 1 that is not shown in which the risks of breakage of the joining portions are minimised. This embodiment differs from the one shown in FIGS. 26 to 28 because, when the cap 5 is extracted from the mould 1, the first forming element 125 moves together with the extracting sleeve 18 until the inner thread 14 has disengaged completely from the outer punch 62. At this point, the first forming element 125 and the extracting sleeve 18 stop but, whilst the first forming element 125 is kept stationary, the extracting sleeve 18 is moved along the axis Z1 in such a way as to move away from the die. The cap 5 cannot move together with the extracting sleeve 18 inasmuch as the bottom wall 13 thereof is kept in contact with the first forming element 125. So, the tamperproof ring 16 is deformed until it disengages from the extracting sleeve 18. The cap 5 is now completely removed from the punch device 6.

It should be noted that, during removal of the cap 5 from the punch device 6, the joining portions interposed between the tamperproof ring 16 and the side wall 12 were not stressed. Risks of breakage of the joining portions were thus substantially eliminated, although they are very thin and therefore weak.

The invention claimed is:

1. Mould for moulding bottle preforms, said mould comprising at least two die parts, each die part comprising a recess delimited by a forming surface so shaped as to form a neck portion of a bottle preform, each die part further comprising a conduit arrangement through which a cooling fluid can flow, said conduit arrangement comprising a curved portion which surrounds said recess, an inlet conduit having a supply portion which leads into said curved portion and an outlet conduit having a discharge portion which leaves said curved portion so as to define a path for said cooling fluid, said path extending from said supply portion to said discharge portion, said curved portion having a first end into which said supply portion terminates and a second end from which said discharge portion starts, wherein said curved portion, a length of said inlet conduit at said supply portion and a length of said outlet conduit at said discharge portion are so arranged as to be intercepted by a common plane that contains said path, said curved portion being intercepted by said common plane from said first end to said second end, and wherein said conduit arrangement comprises a further curved portion that surrounds said recess.

2. Mould according to claim 1, wherein said curved portion extends substantially along a circumference arc.

3. Mould according to claim 1, wherein said inlet conduit and said outlet conduit are interceptable by said common plane over the entire length thereof.

4. Mould according to claim 1, wherein said conduit arrangement comprises a supply section that connects said inlet conduit to a supply of said cooling fluid.

5. Mould according to claim 4, wherein said supply section is connected to an end of said inlet conduit that is opposite said supply portion.

6. Mould according to claim 4, wherein said supply section is substantially perpendicular to said inlet conduit.

7. Mould according to claim 1, wherein said conduit arrangement comprises a discharge section that connects said outlet conduit to an outlet of said cooling fluid.

8. Mould according to claim 7, wherein said discharge section is connected to an end of said outlet conduit that is opposite said discharge portion.

9. Mould according to claim 7, wherein said discharge section is substantially perpendicular to said outlet conduit.

10. Mould according to claim 1, wherein said further curved portion extends substantially along a circumference arc.

11. Mould according to claim 1, wherein said further curved portion is interceptable by a further common plane.

12. Mould according to claim 11, wherein said further common plane is substantially parallel to said common plane.

13. Mould according to claim 1, wherein said curved portion and said further curved portion are interceptable by a substantially cylindrical surface which extends around said recess.

14. Mould according to claim 1, wherein said conduit arrangement comprises a connecting conduit arrangement that connects said curved portion to said further curved portion.

15. Mould according to claim 14, wherein said curved portion and said further curved portion are interceptable by a substantially cylindrical surface which extends around said recess and said connecting conduit arrangement is interceptable by said substantially cylindrical surface.

16. Mould according to claim 14, wherein said connecting conduit arrangement comprises a first connecting conduit that extends to said further curved portion from a junction zone between said curved portion and said supply portion.

17. Mould according to claim 16, wherein said connecting conduit arrangement comprises a second connecting conduit that extends to said further curved portion from a further junction zone between said curved portion and said discharge portion.

18. Mould according to claim 17, wherein said first connecting conduit and said second connecting conduit are substantially orthogonal to said common plane.

19. Mould according to claim 14, wherein said connecting conduit arrangement comprises a plurality of connecting conduits substantially parallel to one another, that connect corresponding intermediate regions of said curved portion and of said further curved portion.

20. Mould according to claim 17, wherein said connecting conduit arrangement comprises a third connecting conduit and a fourth connecting conduit converging on a central zone of said further curved portion.

21. Mould according to claim 1, wherein said conduit arrangement comprises a further inlet conduit and a further outlet conduit, so that through said further inlet conduit and said further outlet conduit said cooling fluid may respectively enter, and exit from, said further curved portion.

22. Mould according to claim 21, wherein said further curved portion is interceptable by a further common plane and said further inlet conduit and said further outlet conduit are interceptable by said further common plane.

23. Mould according to claim 21, wherein said conduit arrangement comprises a first connecting conduit that connects said further inlet conduit to an end of said inlet conduit opposite said supply portion.

24. Mould according to claim 23, wherein said conduit arrangement comprises a second connecting conduit that connects said further outlet conduit to a further end of said outlet conduit opposite said discharge portion.

25. Mould according to claim 24, wherein said first connecting conduit and said second connecting conduit are substantially orthogonal to said common plane.

* * * * *